US005482314A

United States Patent [19]
Corrado et al.

[11] Patent Number: 5,482,314
[45] Date of Patent: Jan. 9, 1996

[54] AUTOMOTIVE OCCUPANT SENSOR SYSTEM AND METHOD OF OPERATION BY SENSOR FUSION

[75] Inventors: Anthony P. Corrado, Upland; Stephen W. Decker, La Cresenta; Paul K. Benbow, Upland, all of Calif.

[73] Assignee: Aerojet General Corporation, Fairlawn, Ohio

[21] Appl. No.: 227,531

[22] Filed: Apr. 12, 1994

[51] Int. Cl.⁶ ................................................. B60R 21/32
[52] U.S. Cl. ..................... 280/735; 364/424.05; 307/10.1
[58] Field of Search ............................... 280/735, 734, 280/728 R, 730 R, 731, 732, 728.1, 730.1; 180/272; 307/10.1; 364/424.05; 340/565

[56] References Cited

U.S. PATENT DOCUMENTS

| | | | |
|---|---|---|---|
| 2,166,580 | 7/1939 | Caldwell | 188/110 |
| 3,512,155 | 5/1970 | Bloice | 343/3 |
| 3,672,699 | 6/1972 | De Windt . | |
| 3,748,639 | 7/1973 | Dobedoe et al. | 340/52 E |
| 3,767,002 | 10/1973 | Gillund | 180/102 |
| 3,774,151 | 11/1973 | Lewis et al. | 180/91 |
| 3,860,904 | 1/1975 | Andersen | 340/52 E |
| 3,898,472 | 8/1975 | Long | 180/82 C |
| 3,935,470 | 1/1976 | Cake | 307/105 B |
| 3,981,518 | 9/1976 | Pulling | 280/730 |
| 4,166,641 | 9/1979 | Okada et al. | 280/735 |
| 4,418,335 | 11/1983 | Genahr | 340/565 |
| 4,476,461 | 10/1984 | Carubia | 340/667 |
| 4,625,329 | 11/1986 | Ishikawa et al. | 382/1 |
| 4,740,701 | 4/1988 | Wuthrich et al. | 250/342 |
| 4,790,190 | 12/1988 | Bambara et al. | 73/660 |
| 4,795,905 | 1/1989 | Zierhut | 250/338.1 |

(List continued on next page.)

FOREIGN PATENT DOCUMENTS

| | | |
|---|---|---|
| 2134590 | 1/1972 | Germany . |
| 2516185 | 10/1975 | Germany . |
| 3635644 | 4/1987 | Germany . |
| 3802159 | 8/1989 | Germany . |
| 3805887 | 9/1989 | Germany . |
| 3809074 | 10/1989 | Germany . |
| 4023109 | 1/1992 | Germany ........................... 280/734 |
| 4137719 | 9/1992 | Germany . |
| 2243533 | 4/1991 | United Kingdom . |

OTHER PUBLICATIONS

Shannon, C. E., A Mathematical Theory of Communication, Key Papers in the Development of Information Theory, Slepian, Ed., IEEE Press 1973, pp. 19–29, reprinted with permission from Bell Syst. Tech. J., pp. 623–656, Oct. 1948.

(List continued on next page.)

Primary Examiner—Margaret A. Focarino
Assistant Examiner—Peter C. English
Attorney, Agent, or Firm—Jacques M. Dulin

[57] ABSTRACT

A system for sensing the presence, position and type of an occupant in a passenger seat of a vehicle, as well as for sensing the presence of a rear-facing child seat therein, for use in enabling or disabling a related airbag activator. The sensor system employs sensor-fusion, a process of combining information provided by two or more sensors, each of which "sees" the world in a unique sense. In a preferred embodiment, occupancy sensor samples two detectable properties, a first being a thermal signature and associated motion, and a second is acoustically measured distance and the associated motion. Infrared sensor inputs and an ultrasonic sensor input are combined in a microprocessor circuit by means of a sensor fusion algorithm to produce an output signal to the air bag controller. The output signal results from preselected confidence weighing for feature parameters generated by the two sensors and upon a fusion process which ultimately makes a decision which is extremely reliable. The sensor fusion matrix processes the sensor outputs in a decision making operation which includes weighing inputs to guarantee reliability. All sensor outputs, along with calibration data, initial conditions and historical reference data are considered in the process of making a decision of whether or not to deploy the passenger-side air bag in a collision.

65 Claims, 17 Drawing Sheets

SIGNAL PROCESSOR FUNCTIONAL BLOCK DIAGRAM

U.S. PATENT DOCUMENTS

| | | | |
|---|---|---|---|
| 4,796,013 | 1/1989 | Yasuda et al. | 340/562 |
| 4,804,859 | 2/1989 | Swart | 307/105 |
| 4,845,377 | 7/1989 | Swart | 307/10.1 |
| 4,849,635 | 7/1989 | Sugimoto | 250/342 |
| 4,886,295 | 12/1989 | Browne | 280/777 |
| 4,948,976 | 8/1990 | Baliga | 250/370.06 |
| 4,951,963 | 8/1990 | Behr et al. | 280/753 |
| 4,973,843 | 11/1990 | Murata et al. | 250/338.3 |
| 4,985,835 | 1/1991 | Sterler et al. | 364/424.05 |
| 5,005,147 | 4/1991 | Krishen et al. | 364/578 |
| 5,071,160 | 12/1991 | White et al. | 280/735 |
| 5,073,860 | 12/1991 | Blackburn et al. | 364/424.05 |
| 5,074,583 | 12/1991 | Fujita et al. | 280/735 |
| 5,118,134 | 6/1992 | Mattes et al. | 280/735 |
| 5,161,820 | 11/1992 | Vollmer | 280/730 |
| 5,172,790 | 12/1992 | Ishikawa et al. | 180/268 |
| 5,184,844 | 2/1993 | Goor | 280/733 |
| 5,218,440 | 6/1993 | Mathur | 358/213.27 |
| 5,232,243 | 8/1993 | Blackburn et al. | 280/732 |
| 5,287,110 | 2/1994 | Tran | 342/13 |
| 5,293,455 | 3/1994 | Castelaz | 395/24 |
| 5,307,289 | 4/1994 | Harris | 364/516 |
| 5,324,071 | 6/1994 | Gotomyo et al. | 280/730.1 |
| 5,330,226 | 7/1994 | Gentry et al. | 280/735 |
| 5,341,459 | 8/1994 | Backes | 395/95 |
| 5,398,185 | 3/1995 | Omura | 280/735 |
| 5,413,378 | 5/1995 | Steffens, Jr. et al. | 280/735 |

OTHER PUBLICATIONS

Gioutsos, T., A Predictive Based Algorithm for Actuation of an Airbag, SAE Technical Paper Series 920479, Reprinted from Sensors and Actuators 1992 (SP–903), International Congress & Exposition, Detroit, Michigan, Feb. 24–28, 1992, SAE International, Warrendale, Pa., pp. 61–66.

Gillis, E. and Gioutsos, T., The Use of Signal Processing Techniques in an Occupant Detection System, SAE Technical Paper Series 940906, Reprinted from Safety Technology (SP–1041), International Congress & Exposition, Detroit, Michigan, Feb. 28–Mar. 3, 1994, SAE International, Warrendale, Pa., pp. 65–70.

Gillis, E. and Gioutsos, T., Occupant Position Sensing Systems: Functional Requirements and Technical Means, SAE Technical paper Series 932915, Worldwide Passenger Car Conference and Exposition, Dearborn, Michigan, Oct. 25–27, 1993, SAE International, Warrendale, Pa., pp. 1–5.

Fukinaga, K., and Mantock, J. M., Nonparametric Discriminant Analysis, IEEE Transactions vol. PAMI–5, No. 6 Nov. 1983 pp. 671–678.

16–Step Range–Finder IC H2476–01, Hamatsu Technical Data, Jan. 1990–Aug. 1988; 3 pages.

PIR 180–100 Pyroelectric IR Detector, Penwalt Kynar Piezo Film Sensor Division, Valley Forge, Pa.; 2 pages.

Database Search Report for Patents on Sensor Fusion, Mar. 2, 1995, Dialog Information Services, 4 pages.

Northrop's BAT Passes Design Review, Flight International Magazine, Jul. 1, 1993, p. 13.

Database Search Report, ("BAT Warhead Passes Tests"), Dialog database version of of article in Flight International Magazine, Jul. 7, 1992, p. 13, Dialog Information Services, 1 page.

JSOW: (AF, 7 Jan. '94), 3. BAT Footprint, (AF 14 Jan. '95) 4. BAT Sensor, Air Force, a journal published by the United States Air Force.

BAT Brilliant Anti–Armor Submunition, a View Graph Summary from the U.S. Army Missile Command, Huntsville, Ala., 24 Mar. 1993.

Database Search Report for Sensor Fusion (Technical Papers and Reports), Mar. 2, 1995, Dialog Information Services, 24 pages.

Database Search Report for DTIC Sensor Fusion, Mar. 2, 1995, Dialog Information Services, 46 pages.

Database Search Report for Sensor Fusion and BAT (Marketing), Mar. 2, 1995, Dialog Information Services, 15 pages.

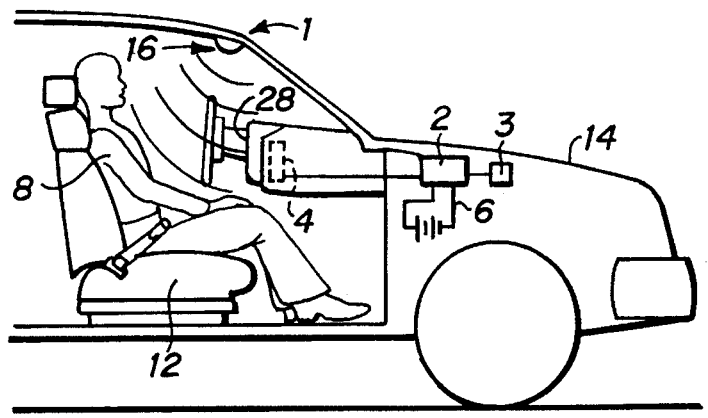
Fig_1
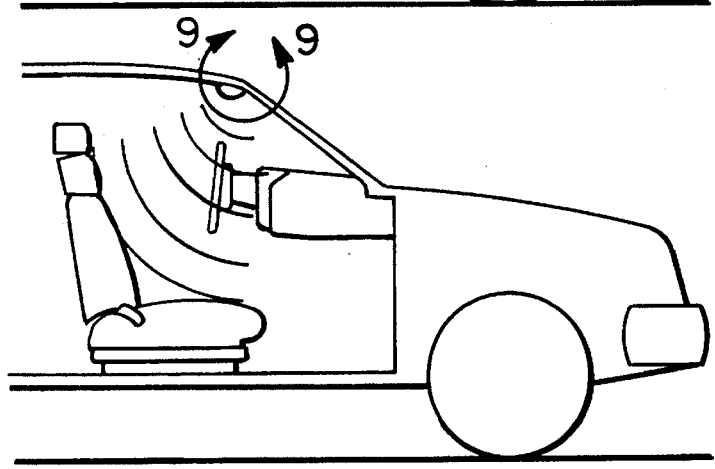
Fig_2
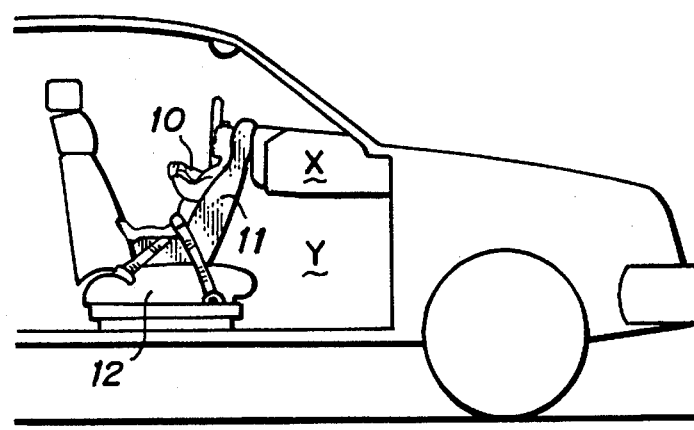
Fig_3
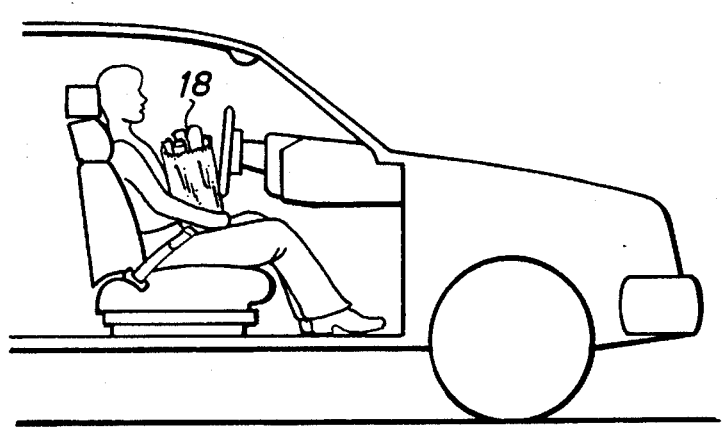
Fig_4

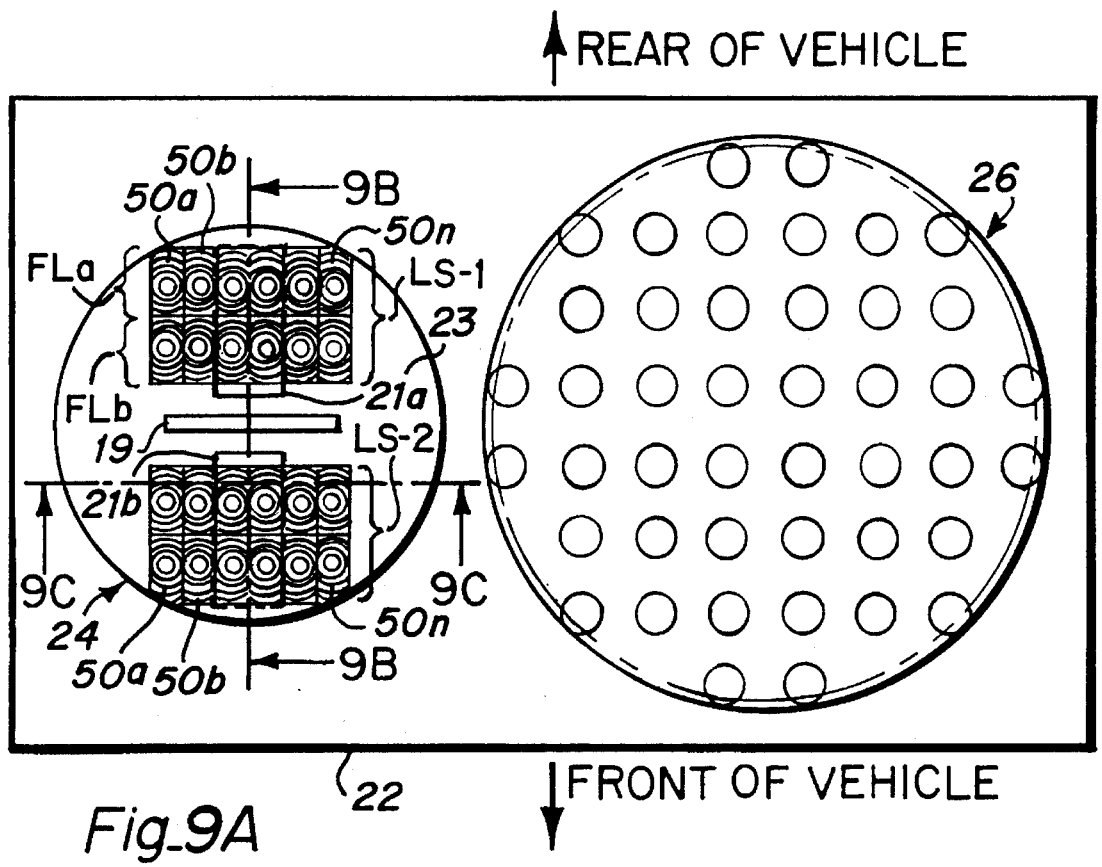
Fig_9A
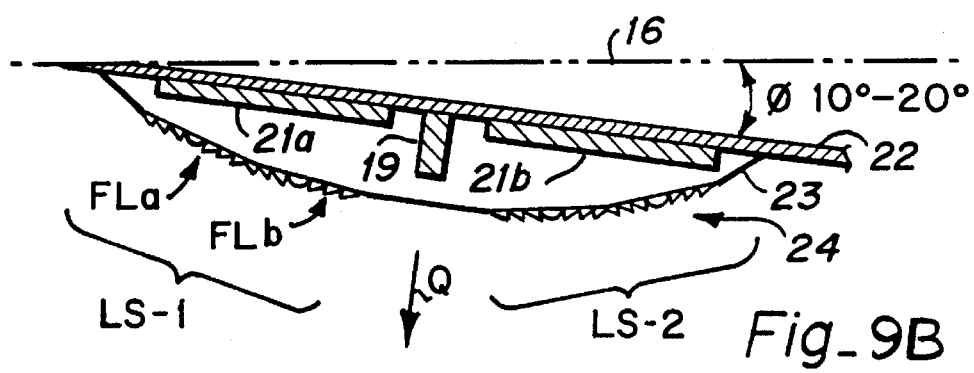
Fig_9B
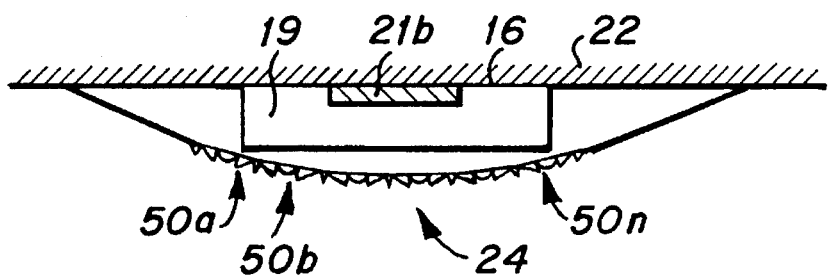
Fig_9C

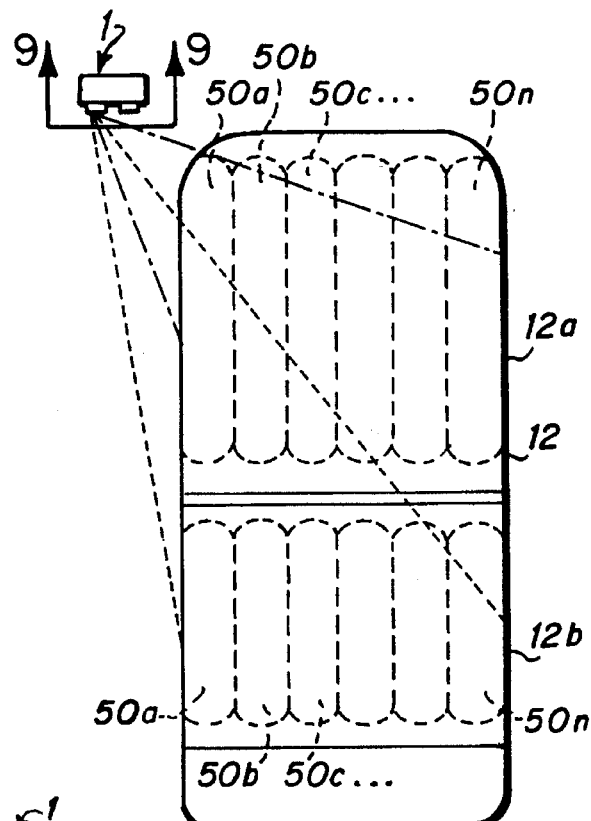
Fig_10
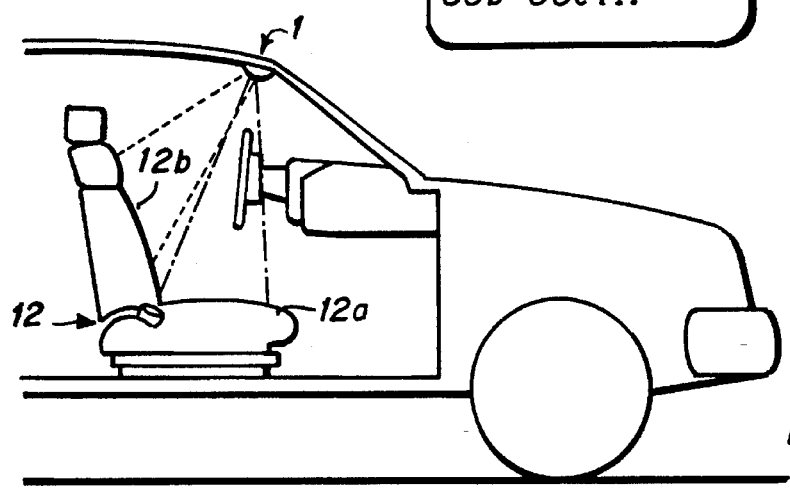
Fig_11a
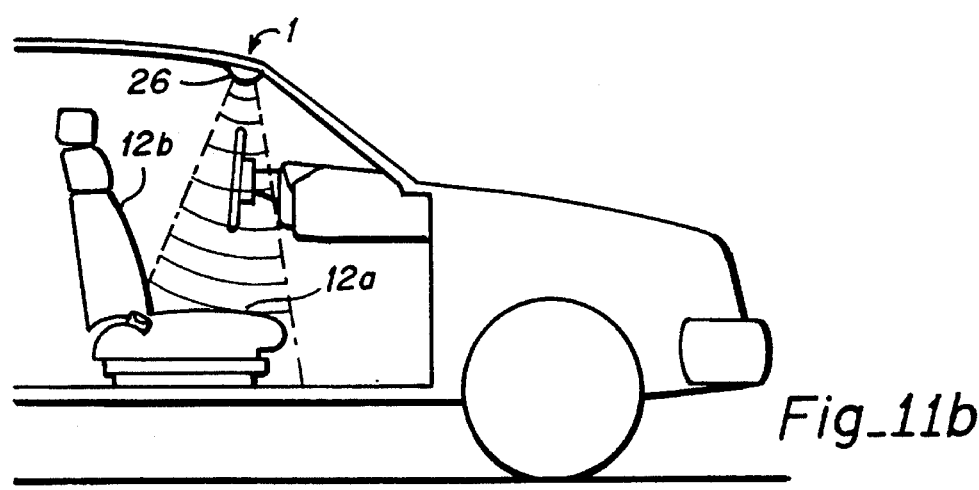
Fig_11b

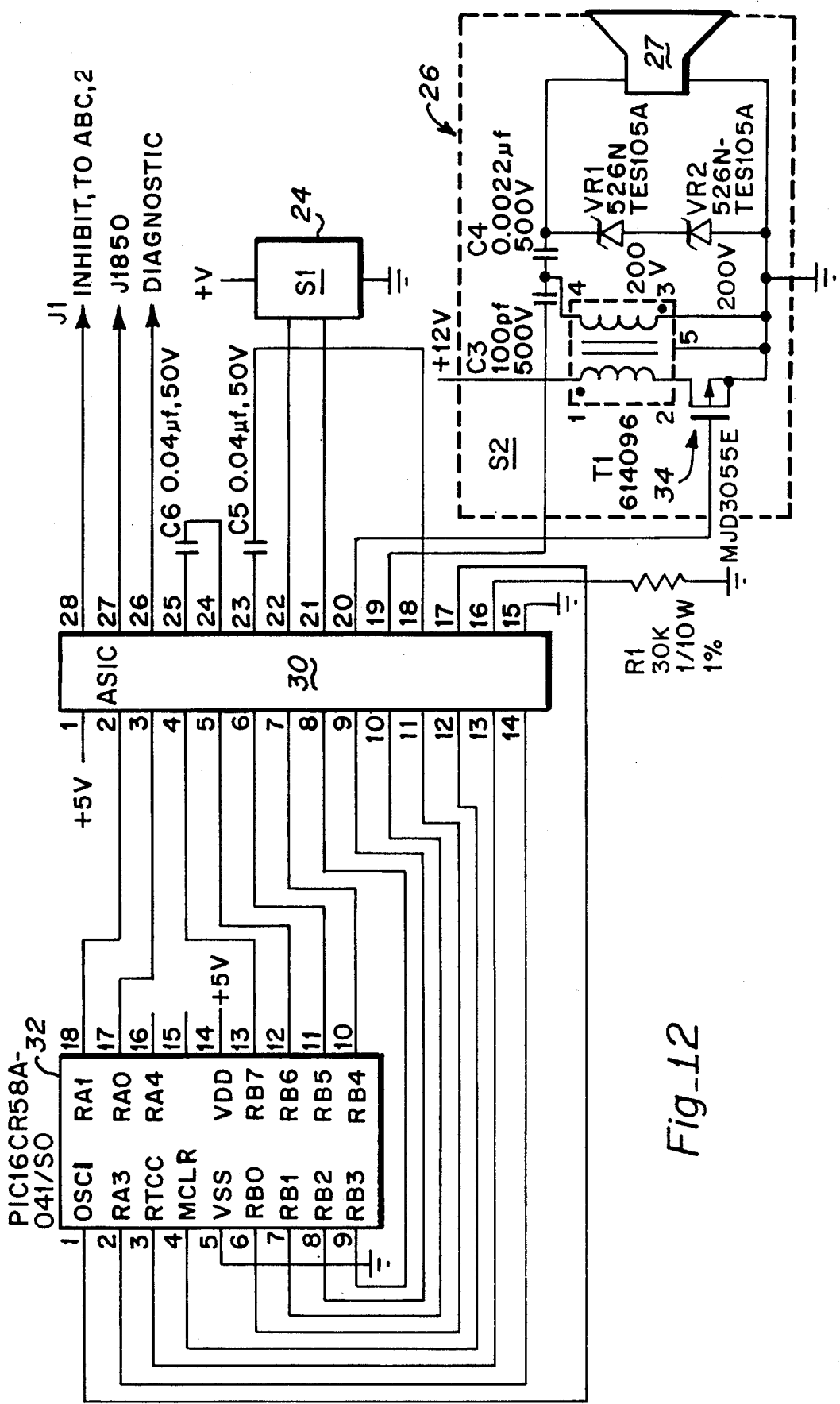
Fig_12

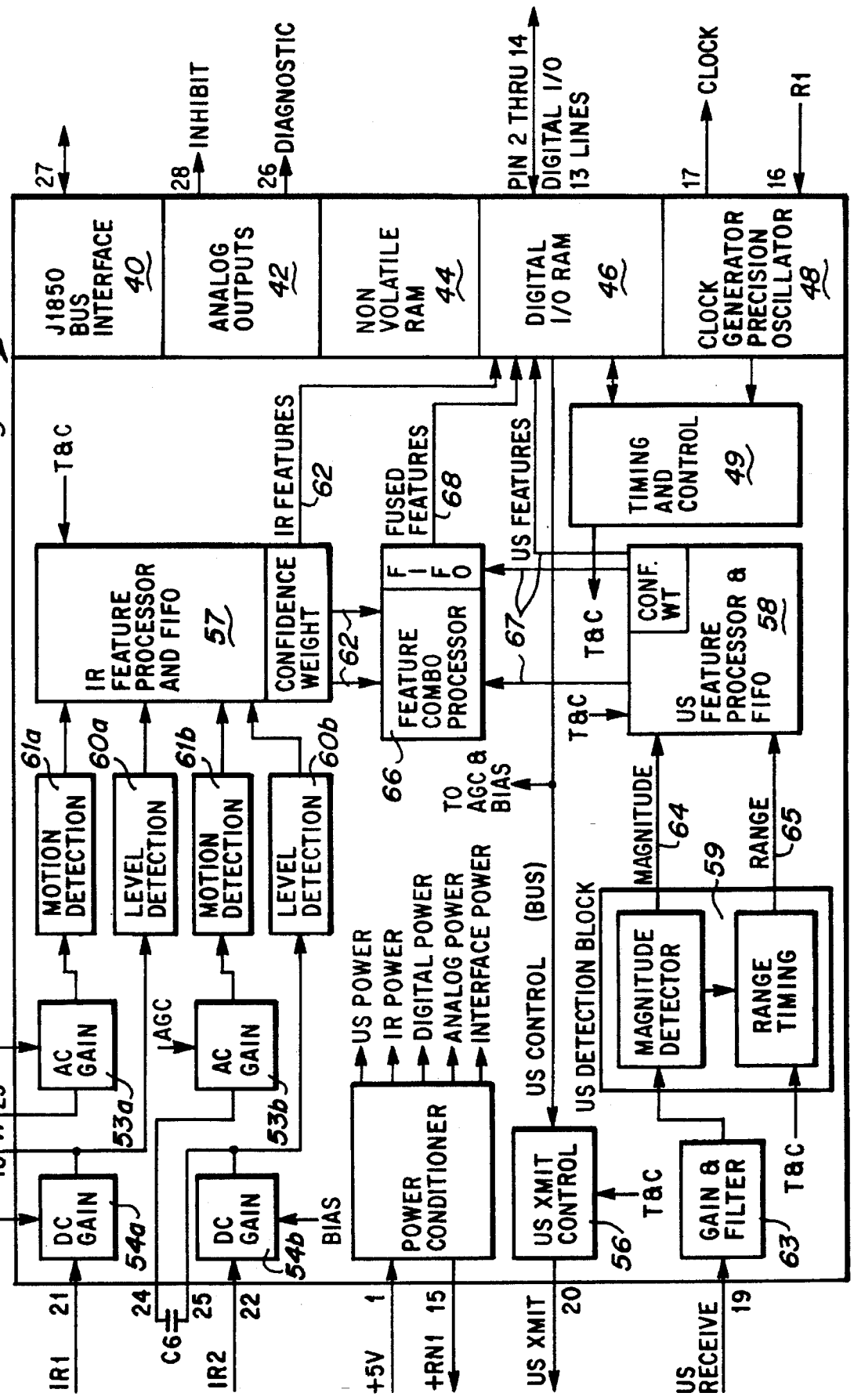

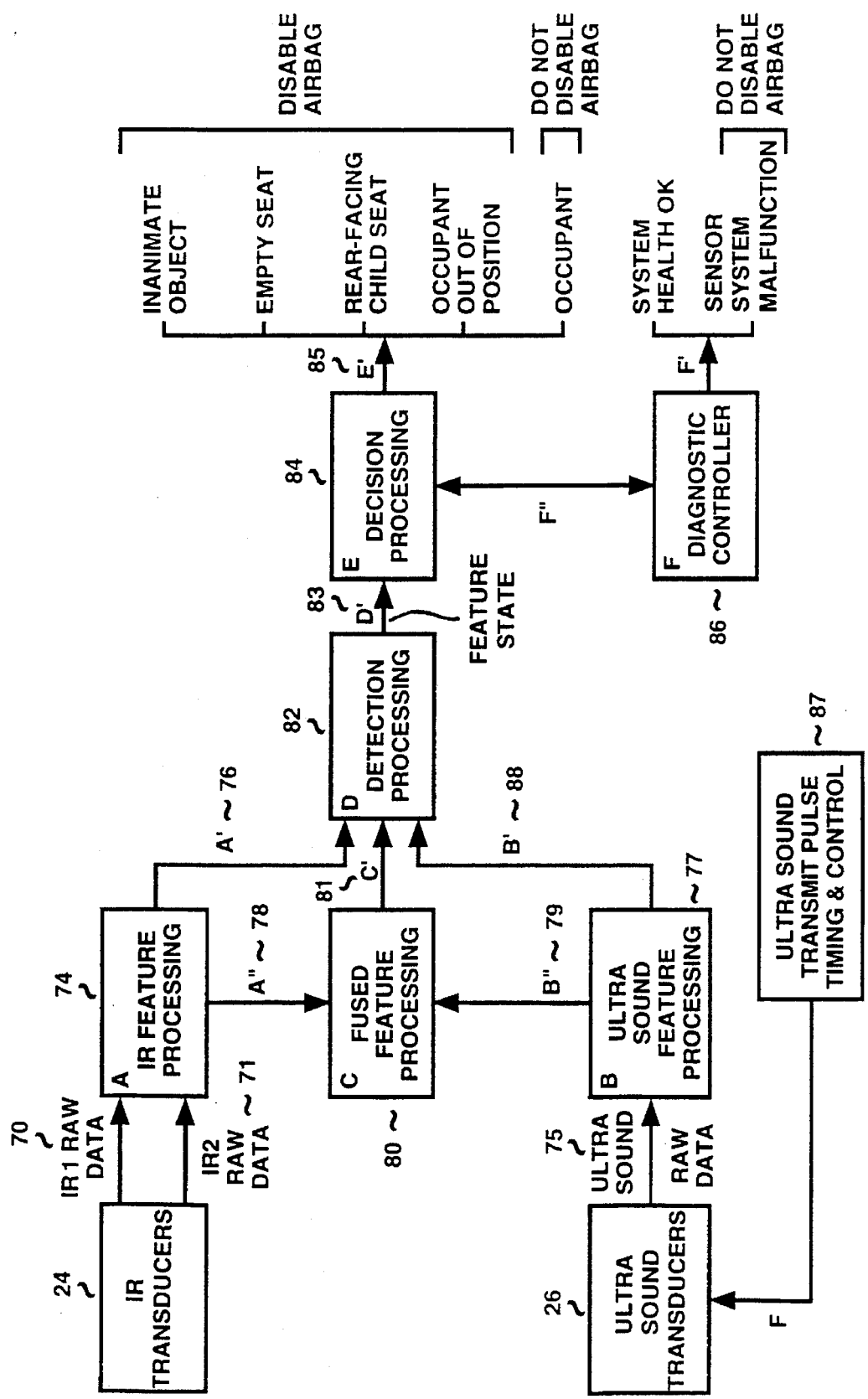
Fig. 14 SIGNAL PROCESSOR FUNCTIONAL BLOCK DIAGRAM

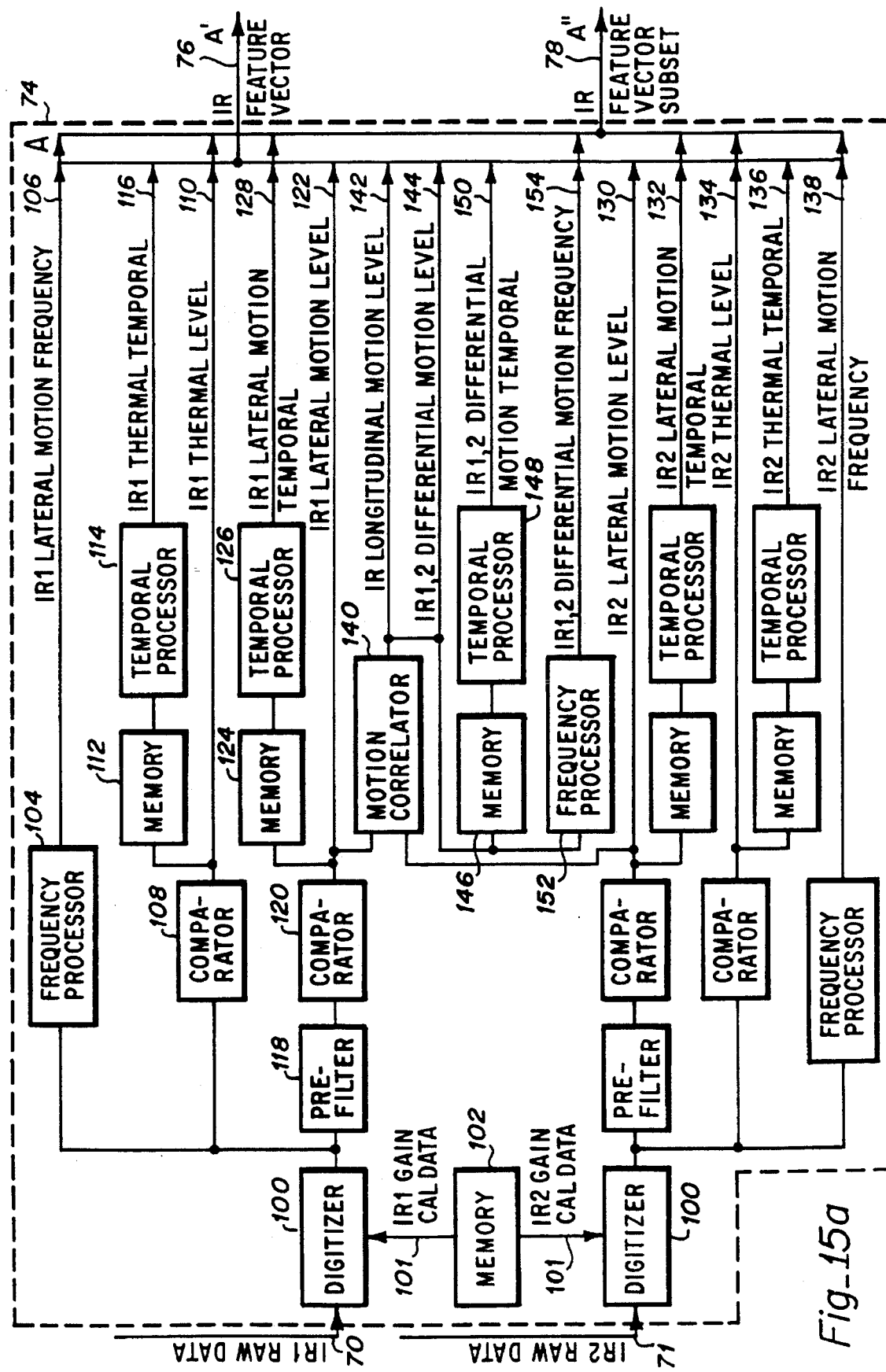
Fig_15a

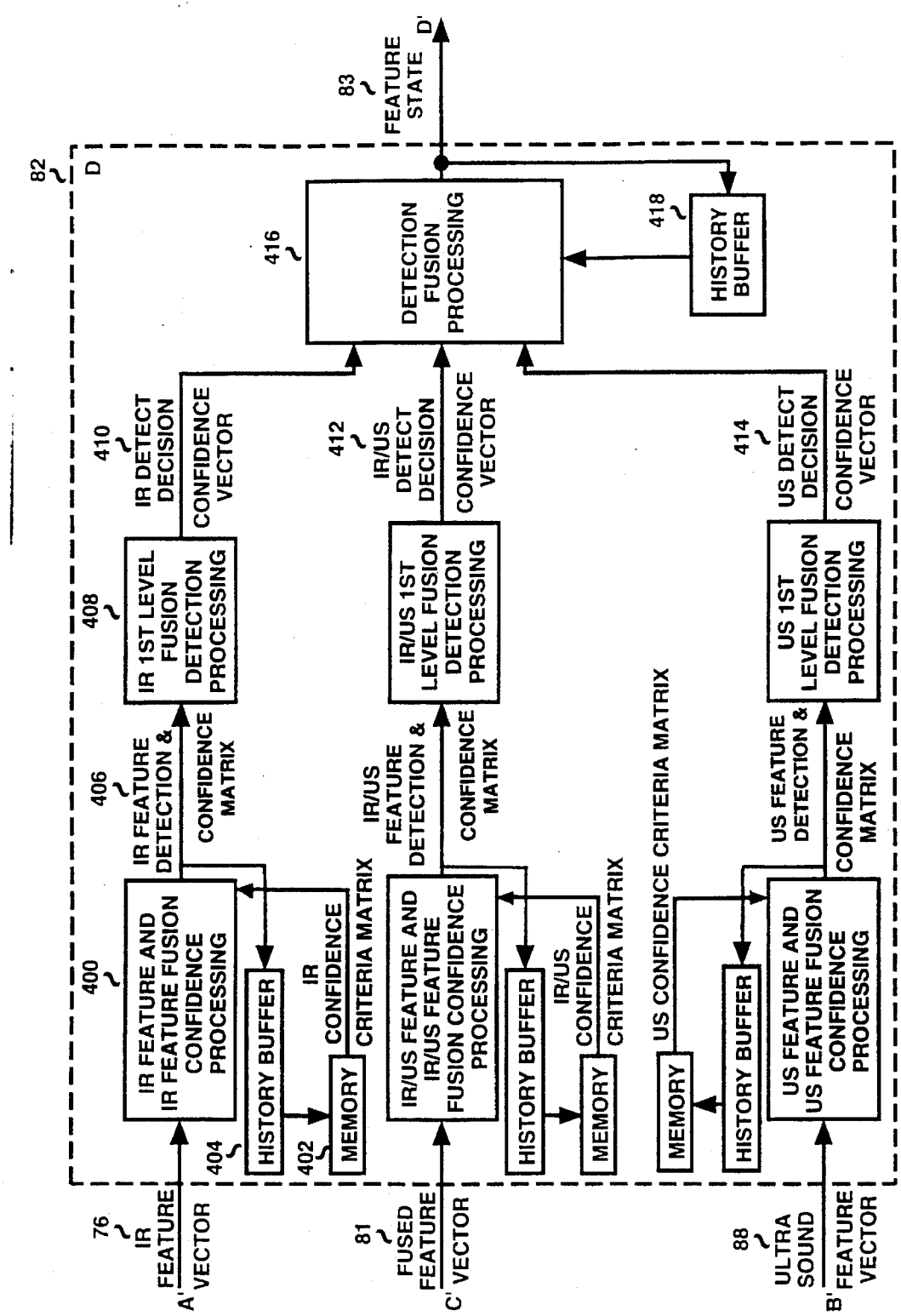

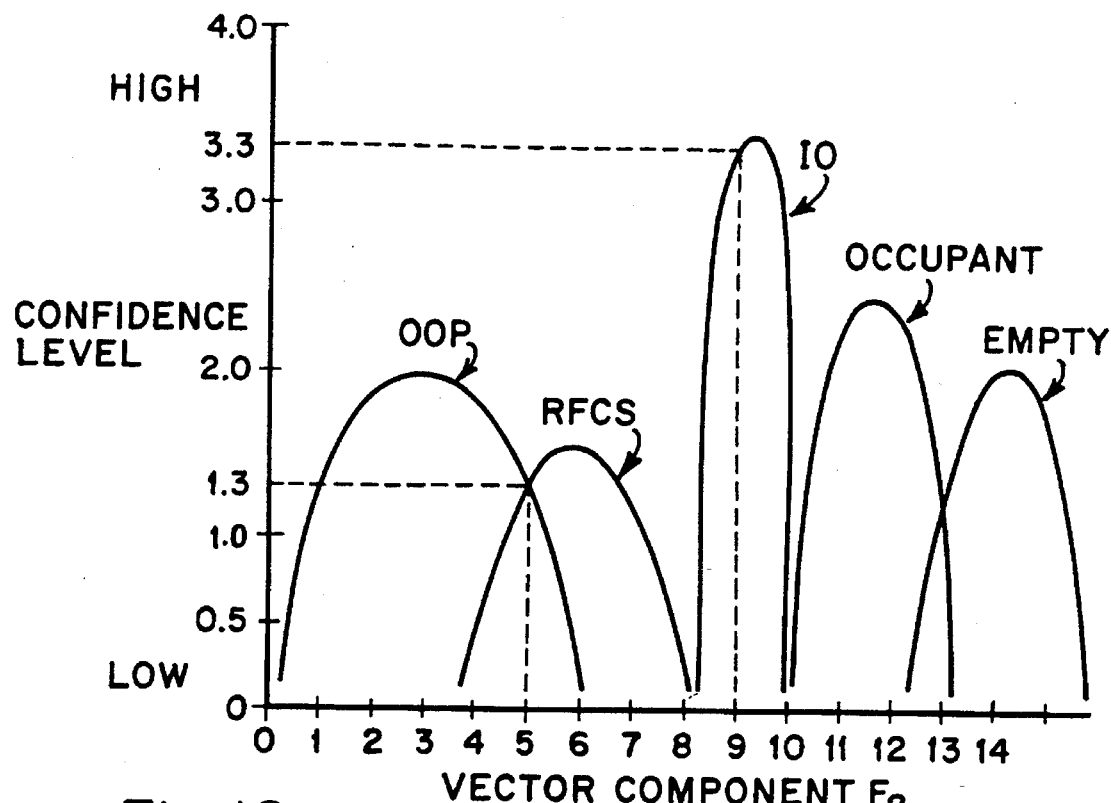
Fig_18
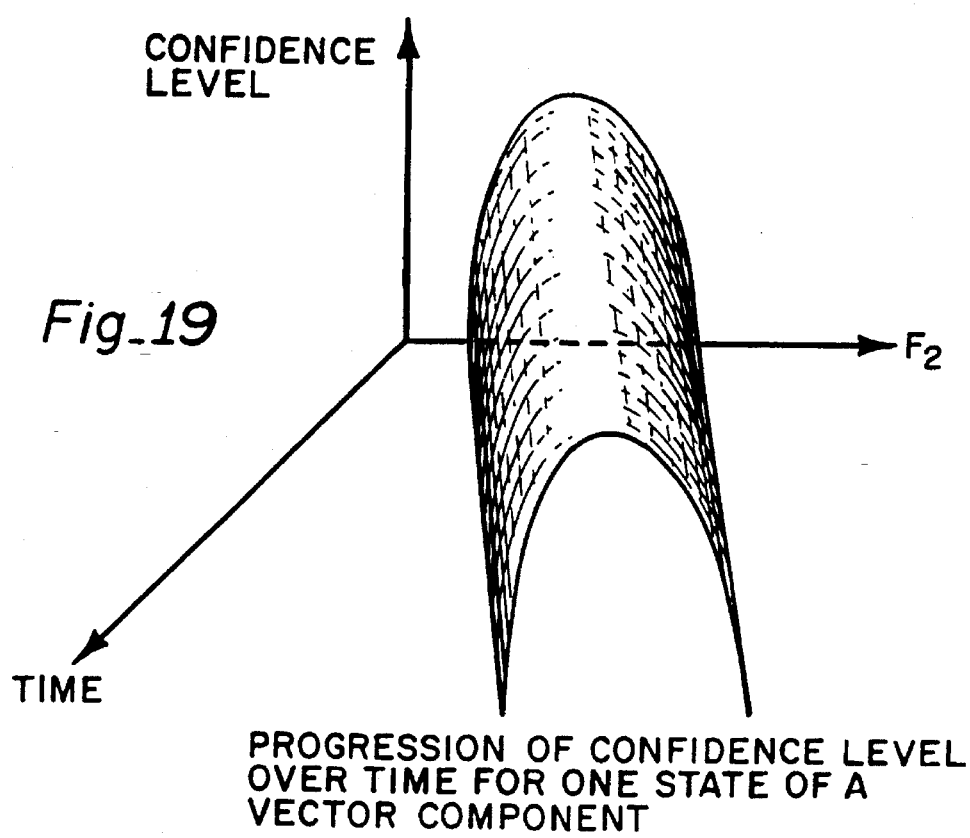
Fig_19
PROGRESSION OF CONFIDENCE LEVEL OVER TIME FOR ONE STATE OF A VECTOR COMPONENT

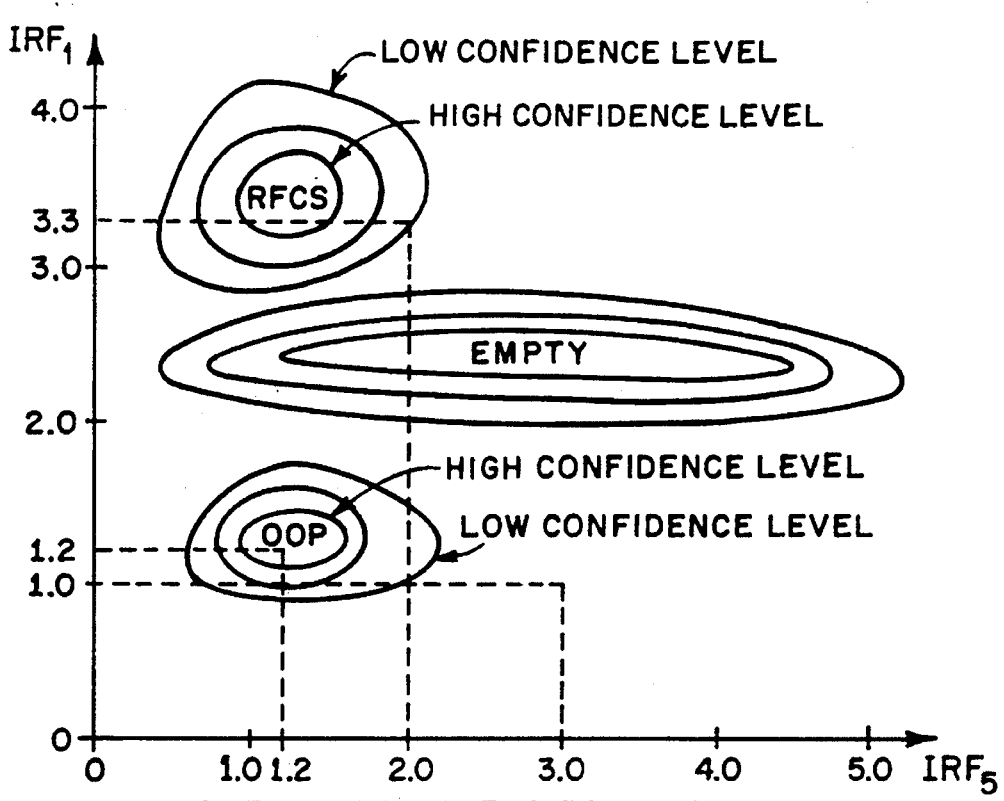
Fig_20
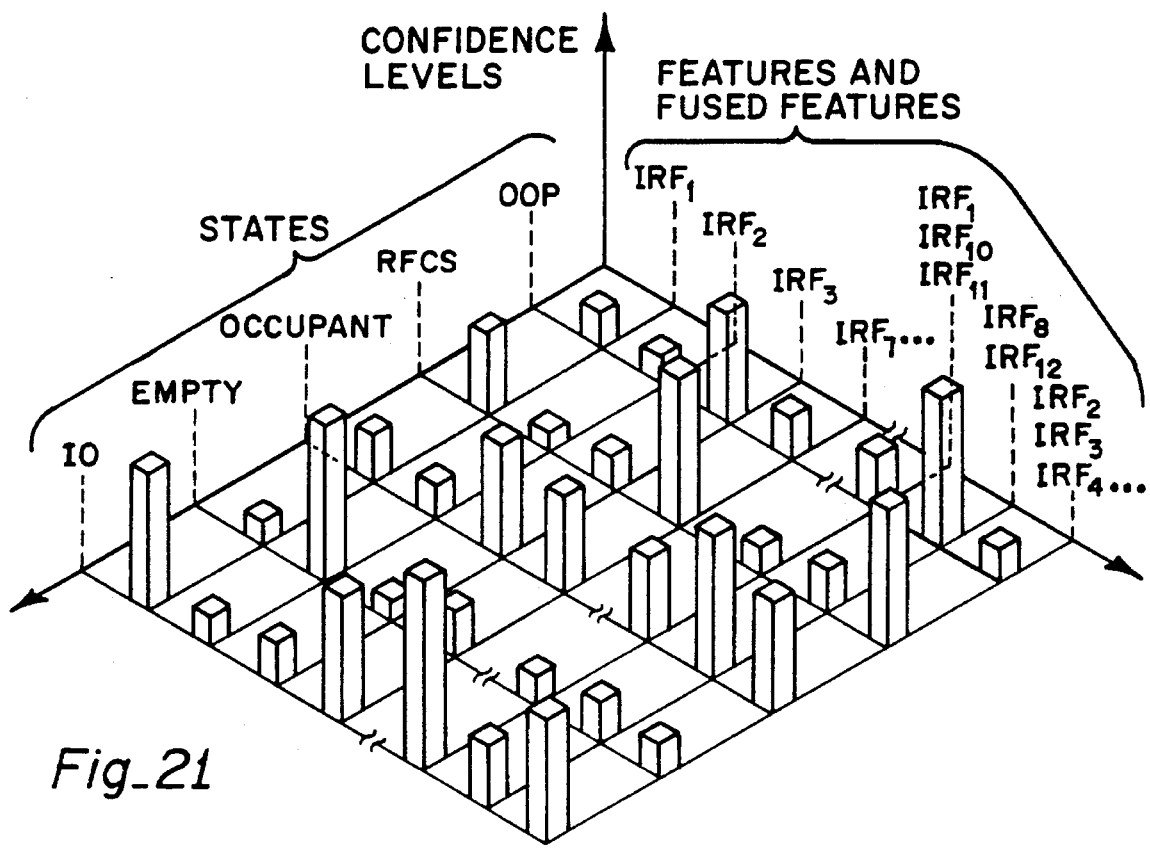
Fig_21

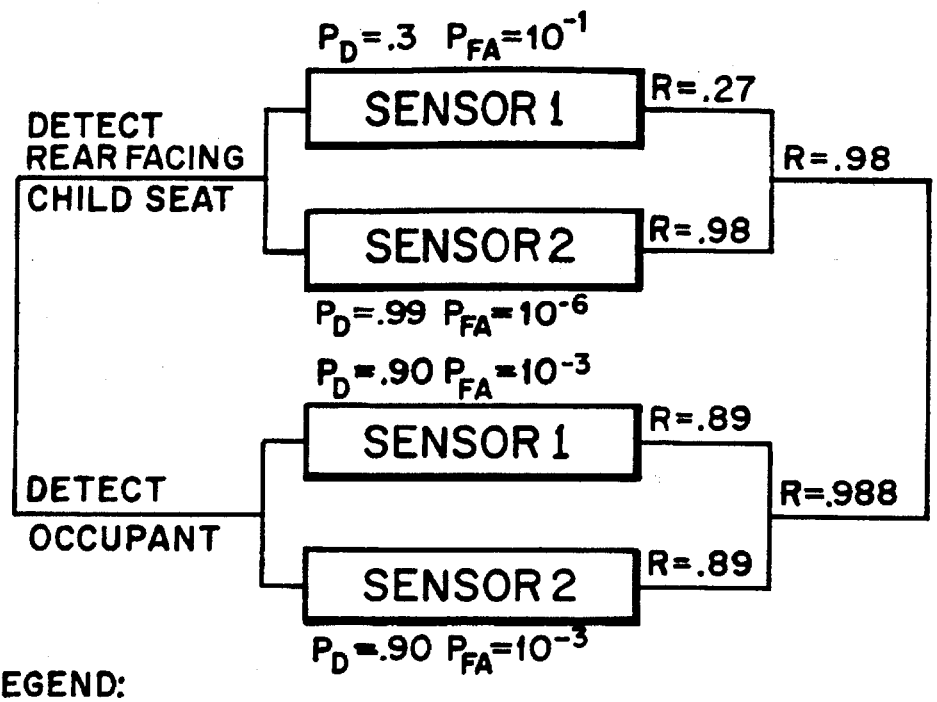

LEGEND:

$P_D$ = PROBABILITY OF CORRECT DETECTION
$P_{FA}$ = PROBABILITY OF AN INCORRECT DETECTION (FALSE ALARM)
R = RELIABILITY, 1.00 = 100%

Fig. 23

| AOS Detection Condition | Range Motion | Range Abs | R Motion | R Abs | Detection Pd |
|---|---|---|---|---|---|
|  |  |  |  |  |  |
| RFCS | 0.9959 | 0.9959 | 0.3760 | 0.2747 | 0.999992 |
| Occupant | 0.9163 | 0.9519 | 0.9959 | 0.7026 | 0.999995 |
| Empty Seat | 0.9163 | 0.9519 | 0.9959 | 0.7924 | 0.999997 |
| RFCS under |  |  |  |  |  |
| 2 Thick Blankets | 0.9591 | 0.9742 | 0.1892 | 0.2747 | 0.999379 |
|  |  |  |  |  |  |
| AOS Diagnostic Condition | R Sensor | US Sensor | ASIC Circuits | Circuit Controller | Diagnostic Pd |
|  |  |  |  |  |  |
| Blockage | 0.9742 | 0.9959 | 0.0000 | 0.0000 | 0.999894 |
| Part Failure | 0.9591 | 0.9591 | 0.9742 | 0.9742 | 0.999999 |
| Out of Spec Part | 0.9163 | 0.9163 | 0.9591 | 0.9519 | 0.999986 |
|  |  |  |  |  |  |

Fig. 26

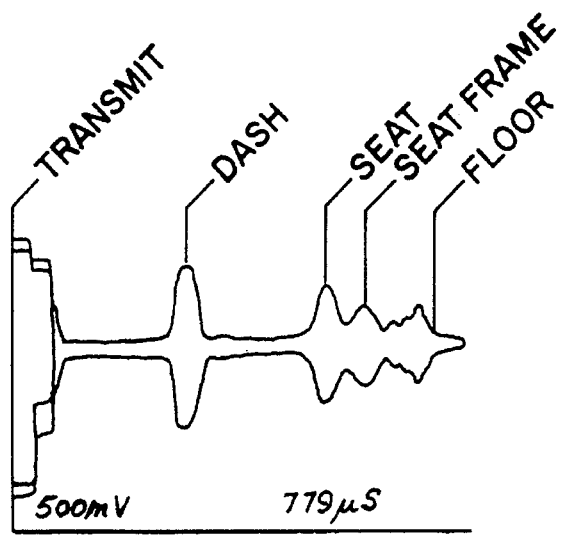
Fig_24a
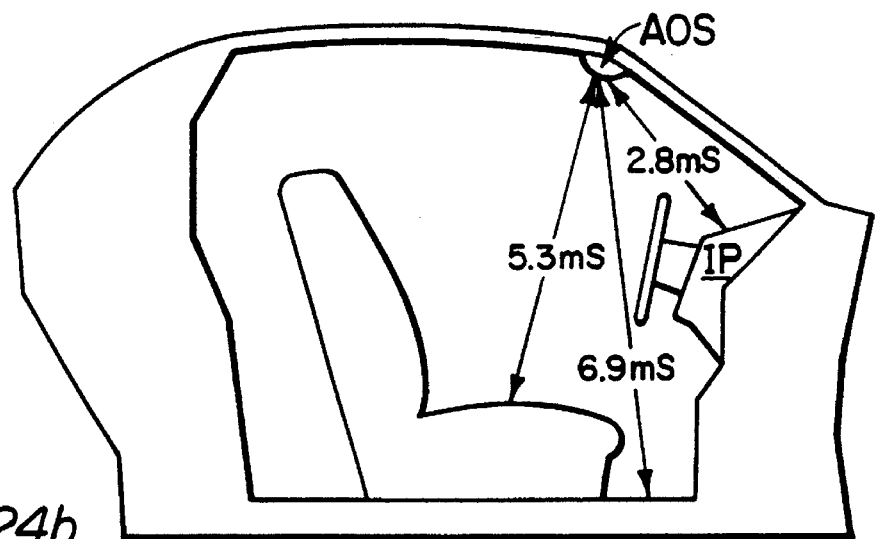
Fig_24b
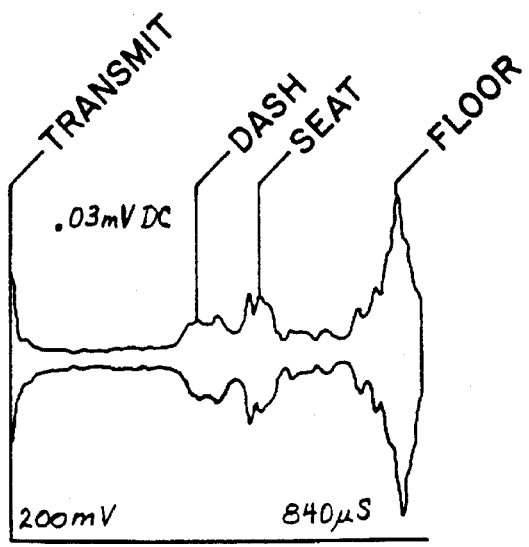
Fig_25a

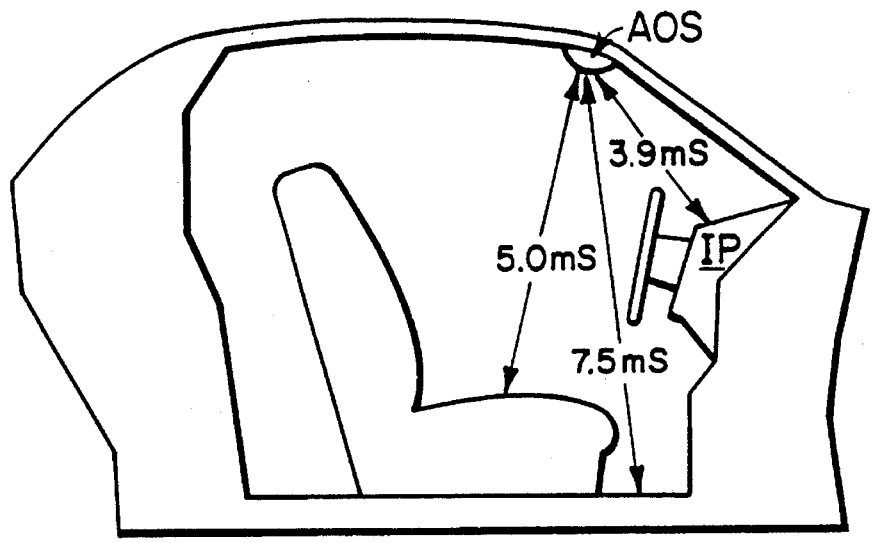
*Fig_25b*
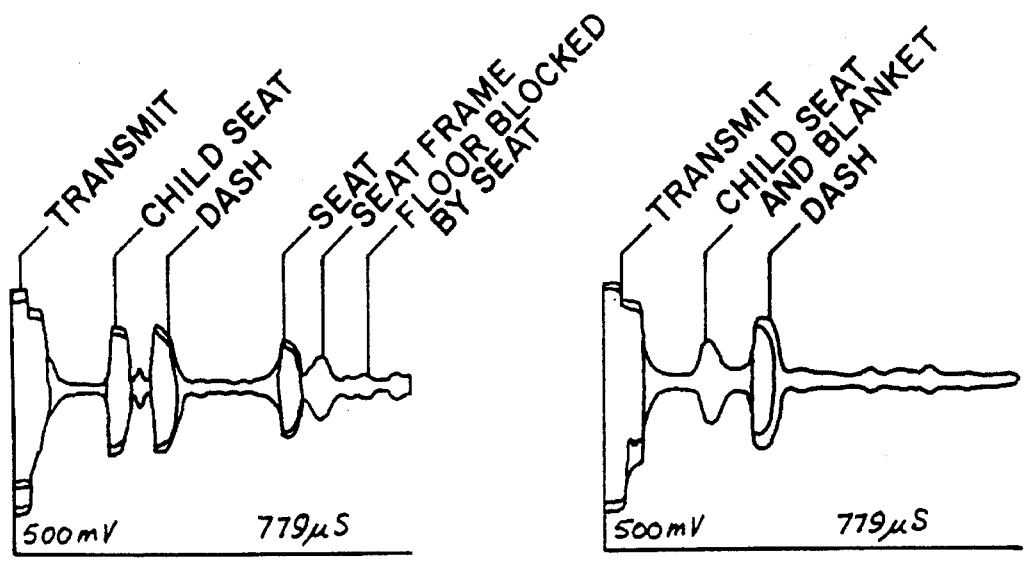
| VEHICLE: | 93 LH | VEHICLE: | 93 LH |
| SENSOR: | P-1 OVERHEAD | SENSOR: | P-1 OVERHEAD MOUNT |
| STATUS: | RFCS | STATUS: | RFCS UNDER 2 BLANKETS |
| AIR TEMPERATURE: | 22.6°C | AIR TEMPERATURE: | 22.6°C |
| SURFACE TEMPERATURE: | 25°C | SURFACE TEMPERATURE: | 25°C |
*Fig_27a*        *Fig_27b*

AUTOMOTIVE OCCUPANT SENSOR SYSTEM AND METHOD OF OPERATION BY SENSOR FUSION

SPECIFICATION

1. Field

The present invention relates to sensor systems and methods of operation for use in automotive interiors to sense the presence, position and type of object in a seat and provide a condition signal for use with other automotive systems, and more particularly in conjunction with air bag activation or other type of safety restraint system for protection of passengers in the event of a collision. One embodiment of the present invention is directed to a multi-sensor occupant detection system for use in conjunction with air bag activation for determining by sensor fusion the presence or absence of a human or animal occupant, the presence and orientation of child seat (front or rear-facing), an out-of-position occupant or other types of occupancy to signal the appropriateness to deploy (or not) the air bag, thereby increasing the reliability and safety of an air bag activation system.

2. Background

Virtually all modern vehicles, autos, vans and trucks, on the American road now have air bag deployment systems. An increasing fraction of the air bag deployment systems currently available includes a passenger-side air bag as well as a driver-side air bag.

However, a passenger-side air bag deployment system presents problems in regard to criteria for deployment. That is, it is not simply an issue of always deploying a passenger air bag, as injury to occupants passengers can occur by deployment in certain situations. For example, the airbag should deploy only if a passenger is in fact occupying the passenger seat, and should not deploy when the seat is empty. However, even more importantly is the problem of deploying a passenger side air bag when there is present in the passenger seat a rear-facing child seat (RFCS), because the deployment of an air bag against the back portion of an RFCS occupied by a child can cause serious injury to the child by catapulting the child into the back of the car seat, thus defeating the safety advantages of both the air bag and the RFCS during a collision.

Accordingly, it is very important to provide a means for determining when the passenger seat is occupied and when it is not occupied. It is even more important to determine when the passenger seat is occupied by a child in a RFCS so that such information can be used to prevent deployment of the airbag when the child seat is present in that orientation. Of course, any means for determining the status of an occupant in the passenger seat, including the presence and orientation of a child seat, must be highly reliable in order to signal deployment of the air bag when the passenger seat is occupied by a passenger and prevent deployment of the air bag when the passenger seat is occupied by a child in an RFCS.

However, it is no easy task to provide a sensor system, meaning sensor units and methods of operation and signal processing, to reliably detect change of state from an empty to an occupied seat and determine the nature, position (location) and/or orientation of a passenger in the vehicle. By way of example, if a thermal sensor is used, its reliability may be reduced by thermal conditions within the vehicle which can change dramatically with the seasons, weather, vehicle interior configuration, rapidly changing exterior shading, passenger clothing and/or size and driver's choice of interior climate, smoking, etc. Thus, a thermal sensor acting alone can lead to falsely declared occupant presence, and more importantly, failure to detect the presence of an occupant. Furthermore, there may be cases where the thermal signature of a rear-facing child seat blends so well with the seat upholstery that a thermal sensor does not see it, allowing the airbag system to deploy despite the presence of a child-occupied RFCS.

Conversely, if one were to use instead distance measurements, such as by the use of acoustic sensors, such sensor must be capable of distinguishing between the presence of an RFCS and the presence of a passenger holding an object which can result in distance measurements which mimic the presence of a rear-facing child seat.

There are other scenarios as well that require a sensor system to recognize and take appropriate action, such as a forward-facing child seat, inanimate objects, a passenger holding an inanimate object, an out-of-position passenger, and so on.

In addition to these basic sensor requirements, the system for determining the presence of a passenger in the passenger seat and the presence or absence of a rear-facing child seat, must be cost effective and must be in a sufficiently small package to prevent interference with normal vehicle operation. Such systems must be compatible with the aesthetics of the vehicle so as not to affect a vehicle's salability particularly as it relates to new passenger cars. Furthermore, the cost of installing such system in the vehicle must remain simple to keep manufacturing cost low. Preferably, all the sensors should be kept in a single unit to ease the assembly of the vehicle in production or retrofitting older vehicles.

There is no currently available sensor system known to the Applicants which can reliably distinguish the presence and absence of a passenger in the passenger seat as well as the presence or absence of a rear-facing child seat in the passenger seat.

There is also no currently available sensor system that can account for a wide variety of possible variations in both thermal and distance parameters that are encountered in the actual wide range of circumstances of occupancy, nor one that is sufficiently versatile to be adaptable to the wide range of vehicle interior configurations.

An example of a system for actuating a driver airbag restraint is shown in White et al U.S. Pat. No. 5,071,160 (Automotive Systems Laboratory) which employs an ultrasonic acoustic sensor for sensing the position of the driver, a "pyrotechnic" sensor for sensing the presence of the driver, and a pressure transducer within the seat to sense the approximate weight of the driver and an airbag control module to trigger deployment of the airbag. As best understood, when an impending crash is sensed by a crash sensor, a control module samples the sensed position of the passenger at fixed time intervals to calculate the rate of movement of the passenger relative to the various fixed motion structures of the vehicle. This rate of relative passenger movement is used to corroborate the acceleration data from the crash sensor and ensure deployment of the airbag where the passenger is at substantial risk of injury. That is, the interior passenger acceleration is apparently used to prevent false crash signals from the crash sensor. Early crash sensors may trigger airbag deployment during a minor bump in close slow moving traffic or during parking. This "is-the-passenger-being-accelerated-at-the-same-time" system is directed to correcting false signals from the crash sensor.

The patent describes the desired results but does not detail the process or circuitry to achieve these results beyond stating that the airbag control circuit uses error correction methods such as a plurality of each type of sensors (crash sensor, pyrotechnic, ultrasonic, acoustic, and pressure transducer) for each assigned monitoring task to prevent falsing. Accordingly, the control circuit is said to employ redundant sensors for each monitoring task and the instructions executed by the control module are said to include error correction subroutines known to one skilled in the art. A dashboard signal lamp can be lit when the airbag effectiveness is too low, or the likelihood of passenger injury by the airbag is greater than the injury if he hit the steering wheel, dash or knee bolster, the latter being consistent with the slow bump situation described above.

Accordingly, there is a need in the art for a reliable occupant sensor system for use in conjunction with vehicle air bag deployment systems. There is also a need for a sensor system that can meet the aforementioned requirements for reliability in detecting the presence or absence of a passenger or RFCS in a wide range of circumstances, irrespective of whether a passenger is holding an object and irrespective of the thermal conditions that may be found in the vehicle. Such a sensor system must also be a cost effective component of the vehicle that does not detract from the aesthetics of the vehicle interior or unduly increase the cost of manufacturing or assembling a vehicle.

THE INVENTION

OBJECTS

It is an object of the present invention to provide an automotive occupancy sensor system to reliably detect the presence or absence of a passenger in the passenger seat and the presence or absence of a rear-facing child seat in the passenger seat and to provide a signal to the airbag system to either inhibit or permit the deployment of a passenger side air bag during a collision.

It is another object of the invention to provide a vehicle passenger sensing system which relies upon multiple sensors utilizing different physical phenomena to provide signals which are processed by sensor fusion to significantly enhance the reliability of passenger detection while permitting the use of relatively low cost conventional sensors.

It is another object of the invention to provide a vehicle occupancy sensing system adapted for use with a passenger seat of a vehicle to control the deployment of an air bag, and specifically to inhibit the deployment of an air bag when a passenger seat is unoccupied, or occupied by inanimate objects, or the occupant is out-of-position, and when an RFCS is present in the passenger seat, in order to prevent unneeded deployment or unsafe deployment which might otherwise cause injury.

It is another object of the invention to provide a passenger occupancy sensor system which utilizes both thermal and acoustic sensors, the signals from which are processed in a fusing algorithm to produce an output signal permitting deployment of a passenger side air bag only when the passenger seat is occupied by a passenger properly positioned in the seat and inhibiting deployment of an air bag in other preselected conditions of occupancy.

It is another object of the invention to provide a multiple sensor occupancy detection system which processes by sensor fusion certain preselected features extracted from signals provided by different certain sensors which sense different physical parameters to increase the reliability of the individual sensing characteristics of the individual sensors.

It is another object of the invention to provide a multiple sensor occupancy detection system while maintaining low cost in manufacturing of the vehicle by locating sensors in a single unit to ease the task of mounting the sensor system to the vehicle.

It is another object of the present invention to provide a multiple sensor occupancy detection system while maintaining aesthetics of the vehicle by producing a sensor system of minimal size.

It is another object of the invention to provide a sensor system that can be tuned to individual vehicle interior configurations with unparalleled precision of discrimination by sensor fusion signal processing to produce state, condition or decision signals that may be used as input to a wide variety of automotive systems, including but not limited to occupant safety, vehicle integrity and safety, vehicle operating systems condition or position (e.g. seat position and load adjusting systems), unusual conditions, interior temperature control, unauthorized entry (Passive Theft Detergency), near object detection systems, and the like.

Still other objects will be evident from a review of the Summary, Drawings, Detailed Description and claims hereof.

BRIEF DESCRIPTION OF DRAWINGS:

The invention will be more fully understood hereinafter by reference to the drawings in which:

FIGS. 1–8 show various conditions illustrative of the variety and range of real conditions that must be detected and accurately discriminated-amongst by a fully-functional automotive occupant sensor system which, by way of example, is focused on a passenger seat of a vehicle, with: FIG. 1 showing the seat being occupied by a passenger; FIG. 2 showing the passenger seat unoccupied and sensed as "empty"; FIG. 3 showing a child in a rear-facing child seat ("RFCS"); FIG. 4 showing a passenger holding a bag of groceries; FIG. 5 showing a child in a forward-facing child seat ("FFCS"); FIG. 6 showing a dog in the seat; FIG. 7 showing an out-of-position passenger ("OOP"); and FIG. 8 showing a moderate sized package on the seat;

FIG. 9A is an enlarged front view of the sensor taken along line 9—9 of FIG. 2 having an infrared sensor and an ultrasound sensor contained in a single unit, and illustrating a multi-element Fresnel lens system over a dual-detector infrared sensor;

FIG. 9b is a longitudinal section view of the IR sensor taken along line 9B—9B of FIG. 9A;

FIG. 9C is a transverse section view of the IR sensor taken along line 9C—9C of FIG. 9A;

FIG. 10 is a view of the passenger seat and the sensor unit in relative relationship, illustrating the infrared detector zoning of the seat and seat back areas as sensed through the Fresnel lens;

FIG. 11a is a side view illustrating the infrared detectors fields of view coverage on the passenger seat;

FIG. 11b is a side view illustrating a typical ultrasound transducer field of view coverage on the passenger seat;

FIG. 12 is a schematic diagram of the electronic circuit of an embodiment of the sensor system of the present invention;

FIG. 13 is a functional block diagram of an application specific integrated chip ("ASIC") means for carrying out the sensor fusion methods of the present invention;

FIG. 14 is a signal processor functional block diagram illustrating the processing steps used in the operation of the presently preferred best mode embodiment of the sensor system of the present invention;

FIG. 15a and 15b are feature processing block diagrams showing the steps of processing raw data from the sensors to produce infrared (FIG. 15a) and ultrasound (FIG. 15b) feature vectors;

FIG. 17 is a detection processing block diagram showing the processing of the infrared feature vector, ultrasound feature vector, and fused feature vector to produce a feature state;

FIG. 18 is a graph illustrating the relationship between a feature vector component and confidence levels of various occupancy states by way of example: OOP state, RFCS state, inanimate object state, occupant'state, and empty state;

FIG. 19 is a graph illustrating the progression of confidence levels for a given state and a given feature vector component over time;

FIG. 20 is a graph showing confidence level upon fusion of two feature vector components;

FIG. 21 is a graphically illustrated matrix of the relationship between vector components, and fused vector components, states, and confidence levels.

FIG. 23 is a diagram of sensor decision reliability in a case of discriminating between a normal occupant and an RFCS;

FIG. 24a shows a signature trace from an automobile;

FIG. 24b shows the physical layout of the vehicle giving the trace of FIG. 24a;

FIG. 25a shows a signature trace from a truck;

FIG. 25b shows the physical layout of the vehicle giving the trace of FIG. 25a;

FIG. 26 is a table of test data from actual testing of a sensor system of the invention; and FIGS. 27a and 27b are comparative traces showing sensibility of the discrimination between an RFCS and the same RFCS covered with two blankets.

SUMMARY

Figure 5:
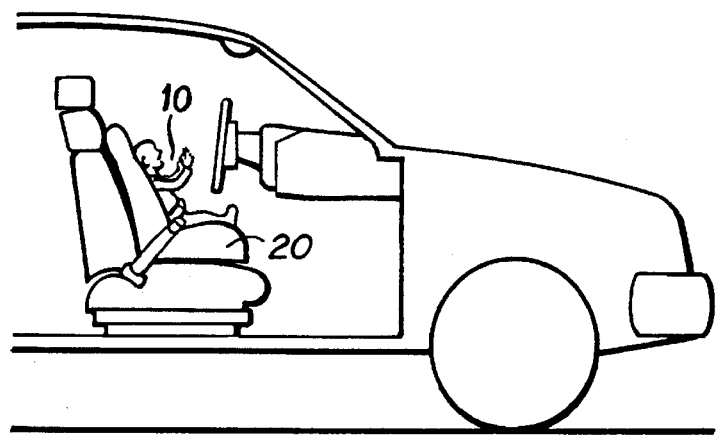

The present invention is directed to an automotive interior occupant sensor system employing sensor-fusion signal processing which combines information provided by two or more sensors, each of which "sees" the world in an unique sense. The multi-sensor fusing process of this invention greatly enhances performance and reliability in much the same way as human ability to visually distinguish and classify objects is greatly enhanced with the addition of sound. While the invention is described in detail with respect to sensing the presence (or absence) of a variety of seat occupants for the purpose of sending a signal to an airbag deployment system thus enabling or disenabling the airbag system to permit or prevent deployment in preselected situations, the "decision" or state signal produced by the sensor system apparatus and sensor signal fusion method of this invention may be applied to also, or alternately, check, affect or trigger other systems, such as automatic safety belts, seat positioning systems, interior climate controls, lighting, dashboard or other signal or warning lights, audio alert or status signals (buzzers, recordings, or synthesized voices), door locks, load adjusting systems, reminder systems crash conditions recording systems, and the like.

In a preferred embodiment, the automobile passenger seat occupancy sensor of the present invention relies on two detectable properties: One such property is the thermal signature and associated motion, and the second is the acoustic distance and the associated acoustic motion. By relying on two distinct sensors in which a plurality of independent features (or characteristics) are extracted and fusing some of these features, the accuracy and reliability of sensing is vastly improved as compared to single sensor or even multiple sensors not employing sensor fusion. For example, in cases where the thermal signature of a rear-facing child seat blends with seat upholstery and provides no motion signal, the distance measurement may be able to detect that something is in the seat with suitable reliability. However, in cases where passengers are holding objects or are much larger than normal, an ultrasonic sensor will provide ambiguous distance measurements which "look" like an RFCS. By the fusion method of this invention, combining features extracted from IR detectors angled and zoned to "look" at different fields and from an ultrasound sensor can ensure proper identification and output of an appropriate decision signal.

In accord with the present invention, measurements of conditions are taken continuously and compared to prior conditions to provide a current state profile. At least initially, the updates are compared to initial conditions obtained at the start-up of the vehicle, and later the comparison is with prior state conditions. If initial conditions indicate a recognized (or "valid") occupant, this condition will tend to prevail throughout operation of the vehicle with the sensor algorithm always erring on the side of safety. If initial conditions indicate an empty seat, a "wake up" mode ensures that passengers changing seats during vehicle operation are detected. A standby mode while ignition is off may be provided in order to draw less power and perform only the minimum required periodic checks and maintenance functions.

Individual sensors will make incorrect decisions by themselves under certain conditions but in unrelated, non-overlapping ways. The fused sensor approach of the present invention covers these failure modes to assure reliable performance by requiring analysis of many different signal features before making a recognition decision. Ordinarily, to compensate for its own area of marginal performance, an individual sensor must become more and more sophisticated, driving up costs. In contrast, the system of the present invention employs fused data from two or more inexpensive sensors, thus achieving the required sophistication level, yet at a significantly reduced cost. Further, in dual sensor operation, self-diagnosis is enhanced by correlating data in one sensor with data from the other.

Although the preferred embodiment of the present invention utilizes passive thermal and active acoustic sensing for their inherent design, simplicity, and safety features, it will be understood that the present invention is not necessarily limited to the use of multiple sensors of the particular type disclosed. While the selected sensors are non-radiative and present no electromagnetic, electro-optic exposure or other exposure hazards to the occupants, it will be understood that other combinations of two or more sensors of different types for occupancy sensing can be readily used to achieve the simplicity and yet high reliability, of the present invention by the sensor fusion method of the present invention. In any case, the sensors disclosed herein do not present any exposure hazards to occupants; for example the ultrasonic unit operates at a frequency well above the hearing range of humans and dogs.

It should be understood that the present invention is not necessarily limited to use in conjunction with an air bag system. It can also be used for security and safety purposes because the combination of two distinct sensor characteristics such as the combination of thermal contrast and motion with acoustic distance and motion as shown herein, prove highly advantageous for its reliability and simplicity in a number of applications outside a vehicle as well as other applications with a vehicle. It may be used as a security system for the premise of a piece of property, both inside of a building as well as outside of the building.

In the preferred embodiment of the invention, infrared sensor inputs and an ultrasonic sensor input are combined in a microprocessor circuit by means of a sensor fusion algorithm to produce an output signal to the air bag controller. The signal results from preselected confidence weighting for the various parameters extracted from the two sensors (called features), and upon a fusion process which ultimately makes a decision which is extremely reliable. An empirical profile, in the form of a lookup table, matrix of values, or empirical relationships, or algorithm is provided for a plurality of known objects (e.g, human occupant, empty seat, rear and forward facing child seat, animal, packages, etc.) either as a generic interior profile or as developed (empirically determined) for a particular interior. During operation the fusion processing compares the signals to a matrix of known condition confidence values to produce a set of confidence weighted values. By way of example, some 14 selected IR features and 13 selected ultrasound features are compared either directly or after fusion to arrive at an overall confidence level that results in triggering the enable/disenable signal (or absence of signal) to the airbag deployment system. The output signals are compatible with AECM interfaces.

The IR sensor unit advantageously includes dual detection elements that look at different areas of the seat, e.g. the seat back and the seat itself. In addition, the "view" of these sensor elements are zoned into vertically oriented parallel zones by means of one or more Fresnel type lenses so that "thermal motion" features can be extracted from the change in thermal signatures from zone to zone.

The occupant sensor algorithm performs the sensor fusion matrix processing and decision making operation on the selected sensor outputs. The fusion matrix has inputs weighted to guarantee reliability in the decision making process. All sensor outputs along with empirical "known" condition data, calibration data, initial conditions and updated historical reference data are considered in the process of making a decision (outputting an enable or disenable signal) whether or not to suppress the deployment of the passenger-side air bag in a collision. By fusing the features and feature vectors to make the decision, each individual parameter has only a partial effect, or "vote", on the ultimate fusion decision. The final decision is based on several conditions or states reinforcing that decision by requiring several independent phenomena or aspects thereof to occur simultaneously.

The fusion process of the invention produces decision with a higher reliability than a single phenomena sensor or non-fused multiple sensors. In addition to performing the multi-sensor fusion decision making, the process requires periodic analysis of the sensor outputs to make certain that all sensors are functioning properly. In addition to normal electrical condition checks, conditions from each sensor output are compared with the output from the other sensor to be sure that all sensors confirm proper operation. In the unlikely scenario where the sensor system fails entirely due to power failure, component failure, or otherwise, the air bag deployment system controller defaults to deployment condition to ensure passenger safety. A diagnostic warning indicator of a failure condition may be provided to the vehicle's indicator panel.

All the sensors of the present invention can be provided in a single unit to maintain low manufacturing cost and simplify the task of assembling the sensor system to a new vehicle or retrofit it to a previously-assembled vehicle. In addition, the aesthetics of the vehicle is maintained by keeping the sensor system unit to a minimal size.

Having two or more sensors in the fusion mode enhances self-diagnostic correlation between the two, for if there is a failure of one but not the other, even in scenarios where no or little signal is expected from the failed sensor, still some of the expected features will be missing and analysis and fusion will identify the failed sensor. For example, if US indicates an occupant, the IR can be polled. If it indicates no occupant, then a potential sensor malfunction is indicated. If there are some features from the IR, say weak signal IR, then the IR may be working but it is not clear what is in the seat until other polled features are analyzed by the fusion process algorithm of the invention.

While a fixed sensor system with angled lenses (for the IR) are shown, a mechanical sweep scan can be employed by mounting one or more sensors on a moving element. Likewise while a fixed US transducer and receiver is shown using pulsing to toggle or poll the sensor, a separate transducer and receiver may be employed. The acoustic signal profile may be shaped to the interior for maximum or narrowly focused coverage in a specific area.

The IR sensor may be an uncooled electric device that responds to IR radiation from the near to far IR (2–12 micrometers wavelength), and the US may be an electrostatic type sensor with a typical frequency range of 40 KHz to 150 KHz. The typical field of view will be approximately 30°×34° for the IR, and 20° to 30° (conical direct or offset) for the US. The US is highly immune to interference because the pulse echo must be received within a preselected time window to be valid. The US beam may be asymmetric for better coverage. A separate IR sensor can be added to the unit oriented to look at the center (middle) passenger location.

Without additional hardware the system of the invention can automatically cycle "on" to measure the interior temperature of the vehicle in which it is installed and send a signal to automatically adjust or cause the cooling fan to operate whenever the interior temperature exceeds a preselected (design selected) maximum value. Additionally, the system can automatically, at "power up", measure the characteristic interior "signature" of the particular vehicle in which it is installed, and by comparing these values to predetermined reference tables imbedded in the ASIC, determine which type of platform it is installed in, e.g., auto or truck. It can then transmit the vehicle identification type to the body controller thus automatically verifying correct and proper functioning at the final installation/assembly point.

The ASIC of this invention permits several additional features to be optionally incorporated into the sensor system of this invention as desired. These include: 1) Center Passenger Occupant Detection (CPOD) employing an additional IR sensor and lens to detect center seat occupancy. 2) Four Quadrant Temperature Control (FQTC). This system replaces presently used sun sensor and environmental control unit. It not only controls the vehicular interior temperature, but also enables automatic selection and control from one to four quadrants of directed HVAC (permitting up to four individual interior temperature settings). 3) Passive Theft Detergency (PTD). The automatic temperature control sensors can be used to detect the presence of a person in the vehicle and through communication with the body controller can decide if entry was proper or not, i.e. was a key used to gain entry (proper) or not (improper entry). 4) Near Object Detection Sensors (NODS). This system utilizes an extremely low power microwave radar which mounted behind a plastic cover (taillight or bumper), and tailored to detect objects within a preselected field-of-view.

The FQTC is similar to the occupant sensor, and uses a "multi-apertured" lens to facilitate motion detection. Further, the sensors are effectively "multiplexed" into the central network processor where sample timing, duty cycle, and sensor select sequence are all programmable.

PTD employs thermistor bolometer (TB) detectors, instead of pyro-electrics, and is thus capable of sensing both the motion of a warm object as well as being able to determine its approximate temperature. This PTD implementation is electronically configured to provide continuous or selected intermittent vehicle monitoring. The electronics (Signal Conditioner, Power Regulator, Motion Sense Logic, etc.) are configured for extremely low (less than 100 microamps) current drain on the vehicle's battery during security "system on" status, such as when the vehicle is unattended with the ignition off. This configuration permits active temperature monitoring of each zone while the automobile is in use. Further, when the vehicle is left unattended, the sensor suite is capable of detecting and reporting unwanted intrusion associated with vehicular theft or possibly a person hiding in the rear seat area.

NODS utilizes microwave (impulse) radar rather than the classical IR and Acoustic sensing, but employs sensor fusion as disclosed herein. Microwave radar is employed due to its ability to operate (invisibly) while protected from an exterior hostile environment by mounting it in a bumper or tail light assembly location. This system possesses a reliable range detection of on the order of 15+ feet. The hardware concept incorporates voltage protection, J1850 Bus interfacing and one or more ASIC(s) for control and algorithm implementation in accord with the principles of the invention. The specific frequency employed is in the range of from about 1.7 to 94 GHz.

The sensor system and methods of the invention key on the following properties: Thermal signatures or contrasts coupled with motion to establish the presence of a warm object; and Acoustic signatures via wave propagation coupled with motion to establish object status, i.e. the distance from dashboard or headliner location of occupants, objects, empty seat, etc. and if animated or stationary.

Both sensor properties are required to meet the reliability requirements because: 1) The need to inhibit the airbag when a rear-facing child seat is more reliably accomplished through dimensional measurements; these are more reliably derived from the acoustic sensor. 2) Thermal conditions within a vehicle change dramatically with seasons, weather, vehicle interior, passenger clothing, and driver use. Using an IR sensor only may lead to higher rate of falsely-declared seat status condition and, more importantly, the failure to detect an occupant present. 3) The self diagnostic capability of the system requires sensor interaction/confirmation to enhance it's reliability.

The signal processing employed in the multi-sensor fusion of this invention is preferably implemented in an Application Specific Integrated Circuit (ASIC). In addition to the signal processor ASIC, a micro-controller provides additional decision making power and system control functions. The ASIC is a mixed signal analog and digital device. It performs signal conditioning, sensor signal detection, non-volatile storage, bus interface, status signal interface, and clock generation functions. The confidence weighting and fusion matrix parameter processing is conveniently performed in software running on the micro-controller or can be implemented using hard-wired logic circuitry. The software can be implemented by one skilled in the art following the Figures as described in detail herein.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Referring now to the accompanying drawings, FIGS. 1 through 7 illustrate a variety of occupancy scenarios to which the present invention is generally directed in its preferred automotive occupancy sensing embodiment. As shown in FIG. 1, this embodiment of the invention comprises a sensor suite 1 mounted in the overhead area above and slightly to the center of the passenger seat 12 of the vehicle 14. As described in more detail below, the microprocessor controller, including an ASIC having the firmware described herein is conveniently located in the sensor unit assembly 1 mounted in the headliner 16 or dash 28. The sensor unit 1 is connected to a conventional airbag controller 2, which in turn activates an airbag 4 in an appropriate crash-sensed situation. The system is conveniently powered by the auto battery 6, or alternately by the alternator or a separate trickle-charged gell cell (not shown).

Figure 6:
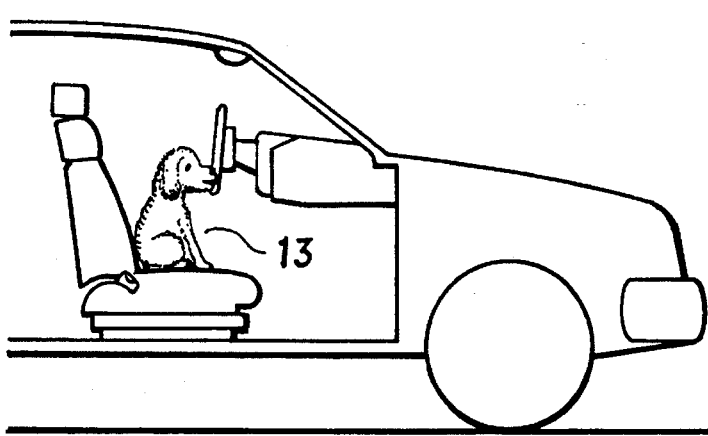
Figure 7:
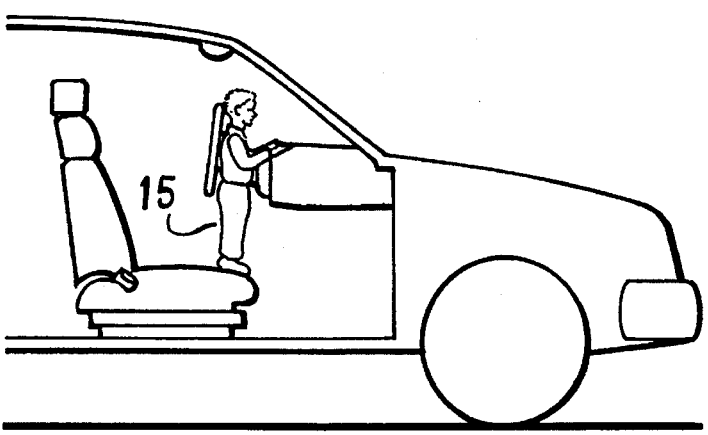

Various possible scenarios are represented by way of example in the following figures. FIG. 1 depicts the passenger seat 12 occupied by an average adult person 8, while FIG. 2 depicts an empty seat. FIG. 3 depicts the presence of a child 10 in a rear-facing child seat (RFCS) 11 mounted on the passenger seat 12. The RCFS will have an unusual thermal pattern as well as distance and vibration signatures due to the possibility that the child may in part be obscured by the seat, thus masking natural thermal radiation. FIG. 4 depicts an adult person holding a bag of groceries 18, which will also have unusual sensor readings. FIG. 5 shows the presence of a child 10 in a forward-facing child seat (FFCS) 20. Unlike the RFCS, this FFCS scenario will have a more nearly normal thermal signature for a small child as well as normal motion and distance readings. FIG. 6 shows the presence of a pet such as a dog 13. Depending on the size and activity of the pet, there will be variation in the thermal, motion, and distance readings and the rate of change thereof. FIG. 7 depicts an illustrative out-of-position (OOP) passenger scenario, where a child 10 is standing up on the passenger seat and holding onto or leaning against the dash board. It could also be a passenger adjusting the radio, or looking out of the front windshield or with his legs or feet up on the dash. In this scenario, the sensor system needs to determine the feasibility of deploying the air bag which depends on the distance of the passenger to the location of the air bag. If the passenger is too close to the air bag location, air bag deployment may not serve any useful purpose, and indeed, might injure the occupant in the process.

It should be noted that in certain scenarios, the location of the sensors unit in the headliner is an advantage. Comparing for example, FIGS. 3 and 7, if the sensors are located at position X and/or Y as compared to the more universal, wide-angled headliner position 16, the RFCS 11 or OOP occupant 15 may obscure or overload one or more of the sensors by coming in contact with the sensor unit face.

Figure 8:
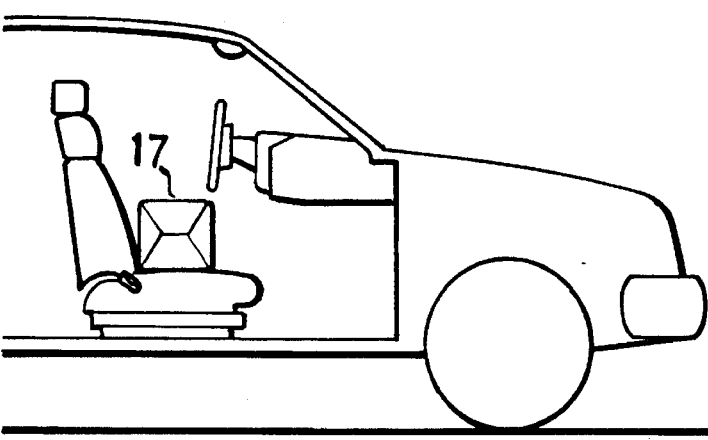

The seat may also be occupied by passengers of different size, such as a small child or a larger person. An occupant may be reclined in the passenger seat or sleeping in the passenger seat without giving off much movement, and both cases will have unusual motion, distance, and thermal signature. Referring to FIG. 8, there may be inanimate objects 17 of various size on the seat which may or may not give off thermal and/or motion signatures.

In addition to these scenarios, the weather and shading conditions may affect the interior environment of the vehicle, especially the interior temperature of the vehicle. On a hot summer day, the passenger seat will be extremely hot after the vehicle has been sitting closed in the sun, and this condition can affect sensor readings. In addition, driving along a tree lined highway can lead to thermal flicker, which could mimic a motion signature, due to intermittent shading and exposure of the seat. The present invention is not limited to the detection of the above-discussed scenarios, as others can be detected as well.

Given this wide variety of occupant and external and internal conditions, the present invention must be able to detect, discriminate and make a decision to permit transmission of an air bag enable signal, or generate a disenable signal to the air bag controller to maximize passenger safety in the event of a collision. In the preferred embodiment of the present invention, these scenarios are categorized into one of the following five states: Empty state, Occupant state, Inanimate Object ("IO") state, Rear-Facing Child Seat ("RFCS") state, and Occupant Out-Of-Position ("OOP") state. For the detected Empty state, IO state, RFCS state, and OOP state, an air bag disenable signal will be sent or supplied to the air bag controller. For the Occupant state, an enable air bag signal will be supplied to the air bag controller or, in the event that the default condition of the air bag controller is to signal the air bag to deploy, no interrupt signal will be sent from the sensor unit to the air bag controller (or air bag). Other embodiments may include more or less states with variation in the scenarios.

The Occupant state is the state where air bag deployment will enhance the safety of a passenger in case of an accident. The Occupant state includes the scenarios of an average adult person, a small child, a child in a forward facing child seat, a passenger holding a bag of groceries, a standing child in some positions, and the like. Note that in the standing child scenario, the air bag will be deployed if the child is sufficiently far away from the air bag deployment location to allow an effective and non-injurious deployment of the air bag. The air bag will not be deployed if the child is too close to the air bag deployment location, since deployment of the air bag might injure the child by knocking it back into the seat. The same consideration applies to the OOP state, a passenger positioned too close to an air bag can be sensed to prevent an injuring deployment.

Typically, it is desirable to disenable the air bag in the RFCS state, the Empty state, the OOP state, and the IO state, e.g. by sending an interrupt signal or interrupting the deploy signal from the airbag controller. It is especially important in the RFCS scenario that the air bag is not deployed in case of an accident. A deploying air bag striking the back of a rear facing child seat could catapult the child and seat backward, possibly injuring the child in the process. In the case of an Empty state or IO state, deploying the air bag in case of an accident ordinarily does not serve any useful purpose, and only adds to the repair cost of re-installing a new air bag in the vehicle. However, the system of the invention is biased toward deployment to ensure the highest level of safety and reliability.

In the preferred embodiment of the invention, the air bag controller is designed to default to the air bag deployment condition. For the appropriate states, such as the Empty state, the IO state, the RFCS state, and the OOP state, the sensor system sends a disenable or interrupt signal to the air bag controller. The present invention is also adaptable for use with a multi-canister controlled pressure air bag deployment system where the air bag is inflated by a number of canisters to the desired pressure. With this system, instead of sending an "on" or "off" type of signal, a quantitative serial, or multiple parallel type of signal can be transmitted to the air bag controller to indicate the desired pressure, or the number of canisters to release depending on the sensed state.

In order to recognize the various scenarios and conditions, this embodiment utilizes two sensors, an infrared ("IR") sensor and an ultrasound ("US") sensor. The infrared sensor used in this embodiment is a commercially available thermistor type of infrared sensor unit, and there are preferably two or more detector elements contained within the infrared sensor unit to allow sensor detection in or from two different regions. Although pyro-electric and photovoltaic types of infrared sensors may be used as well, the thermistor type of sensor presently provides the best cost/performance ratio. In the presently preferred embodiment, the infrared detectors sense the targeted areas continuously with an interrogation period of between about 2 Hz and 10 Hz.

The ultrasound sensor used in this embodiment is a commercially available ultrasound sensor circuit package where the ultrasound frequency and pulse can be externally controlled. The sensor operates in the ultrasonic range above the hearing range of humans and animals such as dogs, and the typical frequency ranges are from 40 KHz to 150 KHz. Frequency selection is determined by requirements such as acoustic losses, range, power, cost, and transducer size. For example, air attenuation and absorption by seats and clothing are increased with frequency; however, the required sensing range here is short, and as a result, the higher end of the frequency range can be selected. The higher frequency also provides the advantage that a small transducer head (sensing element) can be used. In the presently preferred embodiment, the interrogation period varies between 2 Hz and 20 Hz during actual operation depending on the amount or quality of information needed.

FIGS. 9A–9C are enlarged views of the sensor unit of the present invention shown in place in headliner 16 of FIG. 1. The sensors may be placed separately at different locations, but in the preferred embodiment, as shown in FIG. 9A, the infrared sensor 24 and the ultrasound sensor 26 are placed next to each other in a single unit 22. The infrared sensor preferably has two or more detectors 21a, 21b separated by a vertical baffle 19 and covered by a multi-element Fresnel lens 23. Each detector 21a (D-1) and 21b (D2) view different positions of the seat, 21a looking at seat back area 12b, and 21b looking at seat area 12a (see FIG. 10) through, in this example two rows of Fresnel lens elements, Fla and Flb, which form a lens set Ls-1 and Ls-2 respectively. Each row in this example has six individual lens elements 50a, 50b . . . 50n, which look at the corresponding zones 50a, 50b . . . 50n on the seat as seen in FIG. 10. The fields of view of the lens row Fla overlaps the row Flb, but the individual zones 50a in 50n do not overlap. The baffle 19 is generally aimed at the seat belt when worn properly by the passenger, as shown by arrow Q in FIG. 9B.

FIG. 9B is a longitudinal schematic cross section of the IR sensor 24 along line 9B—9B in FIG. 9A showing its orientation with respect to the horizontal in the headliner 16. While the angle θ can be 0° it preferably ranges from about 5°–45° with 10°–30° being preferred. FIG. 9C is a transverse section view of IR 24 taken along line 9C—9C of FIG. 9A. It shows the generally faceted orientation of the zones of Fresnel lens elements 50a . . . 50b. In the alternative, the elements may be stepped with respect to each other.

The Fresnel lens allows the signal strength of a signal source from the middle of the zones to fully pass through. However, as the signal source moves toward the edges of the zones, the Fresnel lens proportionally reduces the strength of the signal passing through.

Although these sensor units can be placed in a number of places in the vehicle, it is preferred to be placed in the headliner 16 above the passenger seat as seen in FIG. 1. The sensor unit can also be placed on the dash board directly in front of the passenger seat or on the passenger side A-pillar. It is anticipated that in the future rear passenger seats may be equipped with air bag protection as well. In this case, a sensor unit placed forward and above the targeted passenger seat in the headliner or in the B pillar can be used to sense rear seat occupancy.

FIG. 10 is a top view of the passenger seat 12 and the sensor unit 1. The passenger seat has a back area 12b and a seat area 12a. Each area (back and seat) is sensed in multiple zones 50a, 50b . . . 50n created by the Fresnel lens elements of the infrared sensor as shown in FIGS. 9A–9C. Note that the infrared sensor uses a Fresnel lens of the type in which each of the infrared detector field of view is divided into, for example, five to eight zones. The infrared detector converts photons (heat) into a change in conductance of the detector which results in a sinusoidal wave voltage when an object laterally crosses each zone.

FIG. 11a illustrates a side view of the orientation of the two detectors 21a, 21b (FIG. 9) of the infrared sensor, looking at the passenger seat 12. One detector 21b is oriented to view the seating area 12a while the other detector 21a views the back 12b of the seat. In addition to receiving zoned thermal signature data, each infrared detector senses lateral motion of the occupant or object crossing the zones 50a . . . 50n in its designated area 12a or 12b of the passenger seat. By combining data from the two infrared detectors, "longitudinal" motion of the passenger can be determined as well. By "longitudinal" motion is meant motion by a passenger (e.g. a passenger's hand) that crosses from the area detected by one detector to the area detected by the other detector, and includes both fore/aft or front/back (with respect to the vehicle) motion and vertical or up/down motion, or compound motion having both fore/aft and vertical components. FIG. 11b depicts the area scanned by the ultrasound sensor 26 when aimed at the seat, and portions of the floor and dash 28.

Referring now to the hardware aspects, FIG. 12 illustrates a circuit schematic for the preferred embodiment of the present invention. An application specific integrated circuit ("ASIC"), 30, is designed to receive data from the infrared detector assembly 24 (S1) and the ultrasound detector 26 (S2). The ASIC processes the data by controlling a commercially available microprocessor 32, and produces outputs to the Inhibit line at pin 28, the vehicle on-board computer system data bus, J1850, at pin 27, and the Diagnostic line at pin 26. The ASIC controls ultrasound transmission by modulating an "on" or "off" voltage through pin 20 of the ASIC to the transistor, 34. The transistor in turn is turned on for a short time period to allow current to flow through the primary winding of the transformer T1, which creates a current flow through the secondary winding of the transformer. The current flows to the transducer 27, which in turn transmits an ultrasonic pulse. The returning ultrasonic signals are received by the transducer 27 and returned to pin 19 of the ASIC. Infrared signals from the two IR detectors 21a, 21b (FIG. 9) of unit 24 (S1) are received through pins 22 and 21 of the ASIC.

The incoming signals are amplified and filtered via capacitors, C5 and C6. The ASIC embodies an algorithm in its hardware and software in memory to process the signals and uses a commercially available micro-controller, 32, to do the calculations. The resulting output is transmitted via the inhibit line to the air bag controller. The ASIC also provides a diagnostic signal regarding the integrity of the sensor system through pin 26 of the ASIC to the air bag controller (ABC 2 FIG. 1) and the vehicle's indicator panel 28 (FIG. 1). In the event of a system failure, the air bag controller defaults to the air bag enable state. The ASIC may receive inputs from the vehicle's on-board computer system 3 (FIG. 1) through the J1850 data bus, the J1850, regarding the various system conditions and environmental conditions which may allow the sensor system to consider certain environmental factors and vehicle conditions in its overall calculations. The ASIC can also transmit to the vehicle's standard on-board computer its status or output. The ASIC provides an oscillating clock signal to the rest of the board through pin 16.

The ASIC functional description is illustrated in FIG. 13. Although the preferred embodiment is to have one ASIC chip, the described functions may be contained in two or more ASIC chips. The ASIC contains a J1850 Bus Interface 40, Analog Outputs 42, a Non-Volatile RAM 44, a Digital I/O RAM 46, a Clock Generator & Precision Oscillator 48, and a Timing & Control subsystem 49. The Digital I/O RAM 46 provides AGC (automatic gain control) 51 and BIAS to AC Gain 53a, 53b and DC Gain 54a, 54b in the processing of infrared signals, and Ultrasound Control to an Ultrasound Transmit Control 56 in the control of ultrasound through pin 20. The Timing & Control subsystem 49 harmonizes the processing of data among an IR Feature Processor & FIFO 57, a US Feature Processor & FIFO 58, a US Detection 59, a US Xmit Control 56, and the Digital I/O Ram 46.

There are two infrared inputs and they are processed in the same manner. The DC Gain 54a, 54b detects and accumulates infrared signals to allow level detection by the Level Detector 60a, 60b. The fluctuating portion of the infrared signal is sent to the AC Gain 53a, 53b for motion detection and sent to the Motion Detector 61a, 61b. The Level Detector 60 determines the amplitude and sends the information to the IR Feature Processor & FIFO 57. The AC Gain block 53 filters the fluctuating signal with the assistance of a capacitor (C5 or C6) and sends the data to a Motion Detector 61, which sends the processed data to the IR Feature Processor & FIFO 57. The IR Feature Processor & FIFO produces IR Features 62.

The ultrasound signal is received through pin 19, amplified and filtered by a Gain & Filter 63, and sent to the US Detector 59. The magnitude 64 and range 65 is extracted from the ultrasound data and sent to the US Feature Processor & FIFO 58, which produces US Features 67. Both the IR Features 62 and US Features 67 are sent to the Feature Combination Processor 66 to produce Fused Features 68.

The IR Features 62, US Features 67, and Fused Features 68 are sent to the Digital I/O Ram block 46 for processing. The Digital I/O Ram 46 accesses a micro-controller through pins 2 through 14 of the ASIC (FIG. 12) to do the necessary calculations to process the data, and it accesses the Non-Volatile Ram 44 for information. The results are sent out via the Bus Interface 40 and the Analog Outputs 42.

In operation, the detection process is generally as follows: Incoming IR and US signals in a given interrogation time-period are analyzed for features (or characteristics) such as motion, frequency of motion, level of motion, temperature level, distance of objects, increasing or decreasing trends, and so on. There is a set of features for the infrared signals and a set of features for the ultrasound signal. Certain features from each set are combined ("fused") to produce a third set of fused features. Each of the three sets, or vectors, are compared to a predetermine matrix of confidence levels and empirical relationships to determine a just-sensed feature state. A feature state is one of the five possible states described above and is the state determined by the sensor system for this interrogation period. The just-sensed feature state is compared to the current state. The current state is one of the five states discussed above, and is what the sensor system indicates is the actual (near present) condition of the passenger seat. If the just-sensed feature state and the current state are different, a set of criteria is used to determine if the feature state should become the current state. The current state determines whether a disenable or interrupt signal should or should not be sent to the air bag controller.

Confidence levels, or the confidence criteria matrix, are determined as follows: Confidence levels are data obtained from analytical and empirical studies of predetermined known possible passenger seat scenarios. Each such scenario is enacted in the passenger seat under a variety of conditions, and features are obtained and analyzed, Some of the features are fused to obtain fused features. Generally, a confidence level is assigned to each feature and state combination. For example, in the presently preferred embodiment, five confidence levels are used for most features. Some of the features are not good indicators of some of the states for certain scenarios so these particular features have reduced or zero confidence levels for those states.

In more detail, from each scenario, there is a set of infrared features and ultrasound features (or appropriate readings from additional sensors, or from other types of sensors, if used). These features from each scenario are compared to features from other scenarios. After examining all of these scenarios and their features, values are assigned to each feature for each state. These values are called confidence levels, and they are assigned according to the feature's strength in indicating the particular state. For example, in the case of a thermal level (quantitative amount) feature from the infrared sensor, five confidence levels from 1 to 5, with 1 being low confidence and 5 being high confidence, may be conveniently assigned this feature's possible values. After examining thermal level features from all the scenarios, the following observations are made: A thermal level of 1 (low thermal level) is a strong indicator of both the IO state and Empty state; at the same time it is a medium indicator of both the OOP state and RFCS state, and a weak indicator of the Occupant state. A thermal level of 3 (medium thermal level) would perhaps be a high indicator of the RFCS state and OOP state, a medium indicator of the Occupant state, and a weak indicator of the IO state and Empty state; A thermal level of 5 (high thermal level) would be a high indicator of the Occupant state, a medium indicator of the OOP state and RFCS state, and a weak indicator of the Empty state and the IO state. After examining this feature, confidence levels are assigned according to the strength of the indicators for each of the states. Through this process, all of the features are assigned confidence levels. Note that some of the features may be combined ("fused") to provide additional information about the scenarios and confidence levels are assigned to the fused features as well.

Conceptually, these confidence levels are placed in a two dimensional matrix with rows and columns, the columns being the features or fused features and the rows being the states. This matrix is referred-to as the confidence criteria matrix.

In examining all the features and scenarios, empirical relationships can be deduced between the confidence levels developed from the feature and state combinations, and sets of empirical formulas can be derived to convert the confidence levels to probability values for each of the states. More specifically, in the empirical studies all the related features are gathered and analyzed for that state. The inter-relationship(s) of the confidence levels for the features are analyzed to determine how they are related in order to produce a high probability value for a particular state. From this examination, the empirical formulas are determined for this state. Then, using this set of empirically-derived formulas in actual (real-time) scenarios, a probability value (or confidence level) is obtained for the state. A set of formulas is derived for each of the states. A confidence criteria matrix and sets of empirical formulas are developed for each model of vehicle because of the variations in the interior area and passenger seat configuration for each of the vehicles.

In FIG. 14, a signal processing functional block diagram for the preferred embodiment of the present invention is illustrated. Infrared raw data from each of the detectors 21a, 21b (FIG. 9) from the Infrared Sensor 24 (IR 1 Raw Data 70 and IR 2 Raw Data 71) are processed through Infrared Feature Processing 74, which produces an Infrared Feature Vector (A') 76. Similarly, Ultrasound Raw Data 75 from the Ultrasound Transducer 26 are processed through Ultrasound Feature Processing 77, which produces an Ultrasound Feature Vector (B') 88. The ultrasound Transducer can also transmit an ultrasonic pulse via the Ultrasound Transmit Pulse Timing & Control 87. A subset of the Infrared Feature Vector (A") 78 and a subset of the Ultrasound Feature Vector (B") 79 are processed through Fused Feature Processing 80, which produces a Fused Feature Vector (C') 81. These three vectors, Infrared Feature Vector, Ultrasound Feature Vector, and Fused Feature Vector are processed by Detection Processing 82, which produces a Feature State (D') 83. The Feature State is processed by Decision Processing 84 with inputs F" from a Diagnostic Controller 86, and the Feature State is evaluated to determine a Current State (E') 85. Depending on the Current State, a signal disenabling the air bag may be sent to the air bag controller as shown. The Diagnostic Controller 86 also indicates via $F^1$ system health of the sensor system e.g. ok or malfunction, and in the latter case the air bag is enabled.

Sets of features are extracted from the signals for the given interrogation period. In FIG. 15a, the Infrared Feature Processor 74, raw infrared data is digitized by a Digitizer 100 with reference to Gain Calibration Data 101 obtained at the start-up of the vehicle and stored in Memory 102. Gain Calibration Data is used to calibrate sensor readings. From this digitized raw data, the frequency of the lateral motion of object or objects in the passenger seat is extracted and is calculated by a Frequency Processor 104 to obtain an IR 1 Lateral Motion Frequency component 106. From the same digitized raw data, the thermal level of the object at the passenger seat is converted to one of the predetermined levels by a Comparator 108 to obtain an Infrared 1 Thermal Level component 110. The predetermined levels are levels that correspondingly group analog signal values to a set of discrete n-equal levels. This component is compared against previously obtained thermal levels stored in Memory 112 by a Temporal Processor 114 to determine the trend of the thermal level (increasing or decreasing thermal level), and produces an Infrared 1 Thermal Temporal component 116. The digitized raw data is also filtered by a Pre-Filter 118 to enhance motion property of the data, and the data is compared to predetermined levels of motion by using a Comparator 120 and an Infrared Lateral Motion Level component 122 is determined. This component is compared by a Temporal Processor 126 against previously obtained motion levels stored in Memory 124 to determine the trend of the motion level, an Infrared Lateral Motion Temporal component 128.

Raw data from the second detector is processed in the same manner to obtain an IR 2 Lateral Motion Level component 130, an IR 2 Lateral Motion Temporal component 132, an IR 2 Thermal Level component 134, an IR 2 Thermal Temporal component 136, and an IR 2 Lateral Motion Frequency component 138.

The motion levels from the two infrared detectors are correlated by a Motion Correlator 140 to determine a Longitudinal Motion Level component 142, which shows any longitudinal motion of the occupant. The longitudinal information obtained from each detector is contrasted against each other to obtain an Infrared Differential Longitudinal Motion Level component 144, which is significant when there is motion from one detector but not from the other detector. This component is compared by a Temporal Processor 148 against previously obtained components stored in Memory 146 to determine the trend of the motion level or an Infrared Differential Motion Temporal component 150. The frequency of the longitudinal motion of the occupant is calculated by a Frequency Processor 152 to obtain an Infrared Differential Motion Frequency component 154. The Infrared Feature Vector (A') 76 is comprised of the above described infrared components, while only features 106, 110, 128, 154, 132, 134 and 138 are used to form the IR Feature Vector subset A", 78.

Figure 15B:
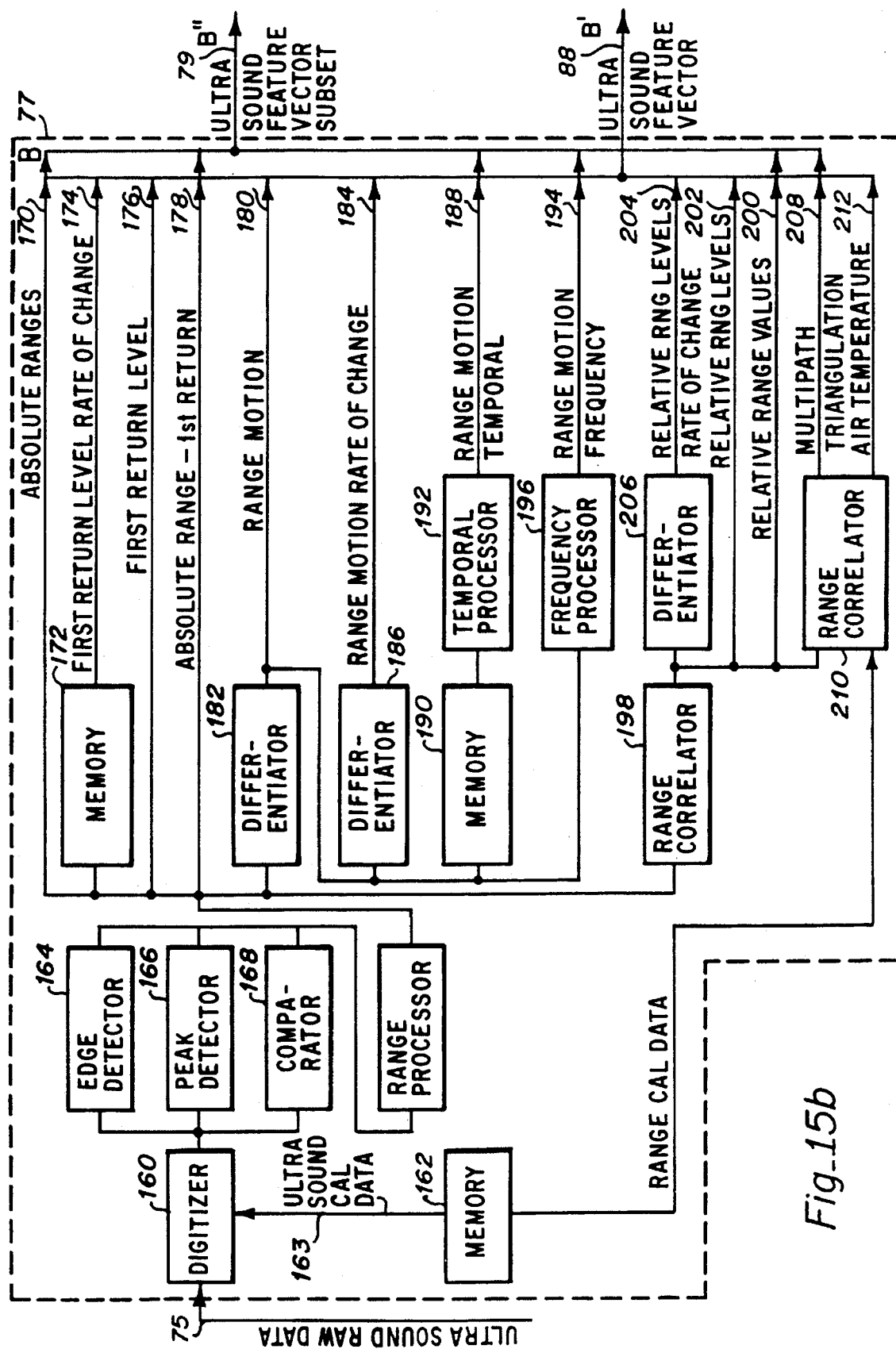

Now referring to FIG. 15b, which illustrate the Ultrasound Feature Processor 77, when an ultrasound pulse is transmitted to the targeted area, the ultrasound transducer may receive several ultrasonic returns shortly after the pulse bounces off several objects. These returns are digitized by a Digitizer 160 with reference to Ultrasound Calibration Data 163 obtained at the start-up of the vehicle and stored in Memory 162. Each of these returns will have a point in time when the return first begins, called an edge, which is detected by an Edge Detector 164. And each of the returns will have a point in time when its amplitude is at the highest level (or peak level) and this point in time is detected by a Peak Detector 166. The amplitude is compared to predetermined levels by a Comparator 168 to obtain return levels. From the edge and peak level time of the returns, Absolute Ranges 170 (or distances) of the objects from the sensor unit are determined. The first return from the transmitted pulse usually indicates the object of interest in the passenger seat area and is the First Return Level component 176. The trend (increasing or decreasing) of the First Return Level component is the First Return Level Rate of Change component 174, which is determined with reference to previous return levels stored in Memory 172. The Absolute Range—First Return component 178 is the absolute distance of the first object from the sensor. The rate of movement of all the returns from one pulse is the Range Motion component 180 found by using a Differentiator 182, and the rate of movement of the Range Motion component is the Range Motion Rate of Change component 184 found by using a Differentiator 186. Range Motion shows the radial component of motion and vibration of an object. The trend of Range Motion, faster or slower over time, is the Range Motion Temporal component 188 determined with reference to previous range motion values stored in Memory 190 and by using a Temporal Processor 192. The frequency of Range Motion is the Range Motion Frequency component 194 determined by a Frequency Processor 196. The relative values between the returns are determined by a Range Correlator 198 to find Relative Range Values components 200, the corresponding levels or the Relative Range Levels components 202, and the trend of Relative Range Levels or the Relative Range Levels Rate of Change component 204, which is determined by a Differentiator 206.

The relative range level components tend to indicate how objects change in relation to each other and may indicate movement of the object in interest. The range motion components indicate whether there is a constant frequency of movement which would tend to indicate an inanimate object, e.g. a vibration or flutter, or if there are random movements which would tend to indicate an occupant.

The Multipath Triangulation component 208 is where the ultrasonic pulse bounces off several objects before it is received by the transducer, and this value is compared by the Range Correlator 210 to the Range Calibration Data 162 obtained at the start-up of the vehicle. This component is helpful in determining whether there is clarity in the scene being scanned. If this component's value is low, it tends to indicate clarity in the scene and a corresponding high confidence in the scan. If this component's value is high, it tends to indicate confusion in the scene and a corresponding low confidence in the scan. The Air Temperature 212 is obtained from the fact that the air is denser at lower temperature than higher temperature, and there is a faster rate of return of the signal at lower temperature because it transmits through denser air. The Ultrasound Feature Vector (B') 88 is comprised of all of the above described ultrasound components, while the ultrasound feature vector subset comprises features 170, 178, 188, 194, 200 and 208 only.

Figure 16:
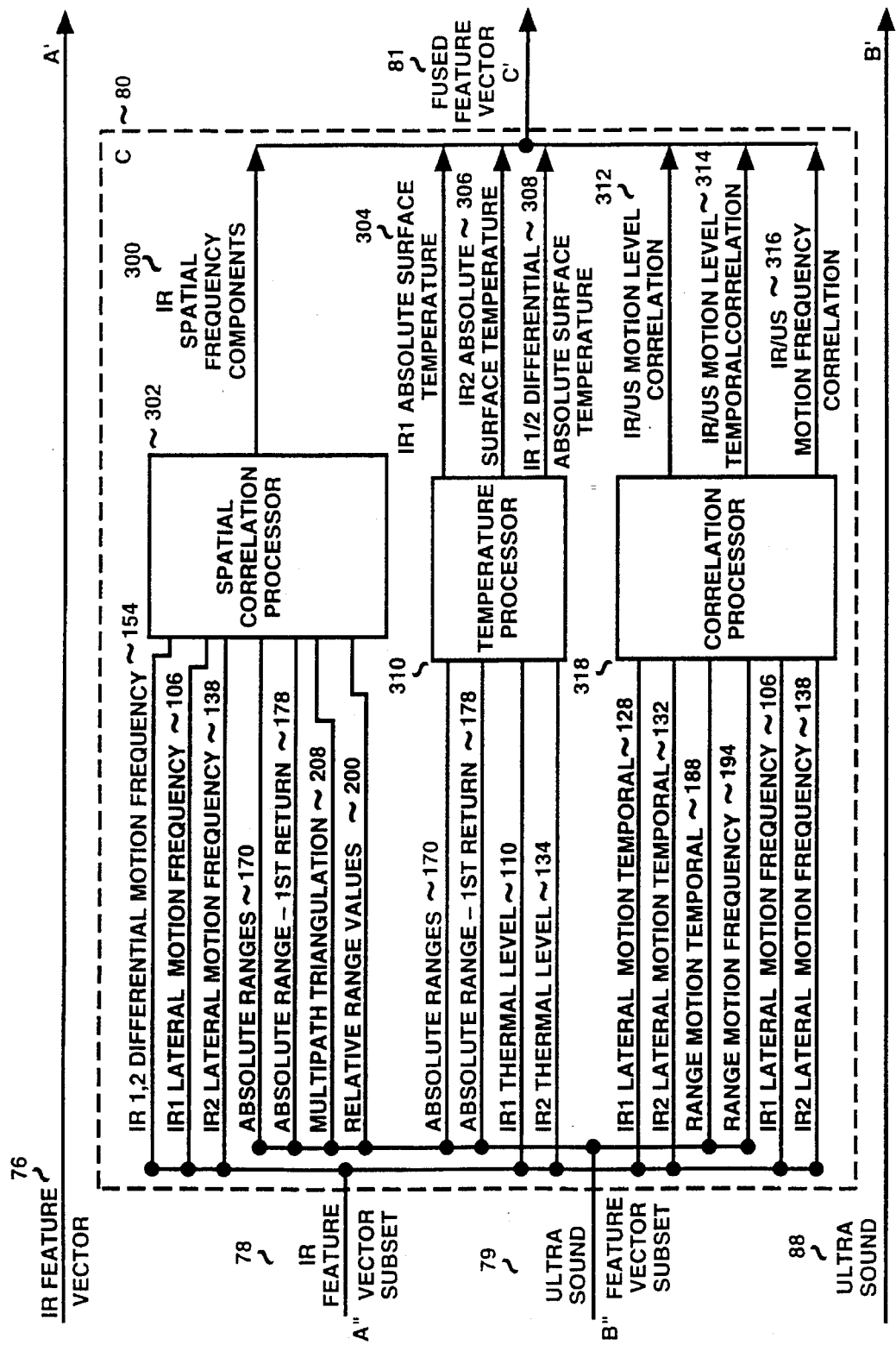
FIG. 16 is a fused feature processing block diagram illustrating the process of fusing infrared features and ultrasound features to produce a fused feature vector.

Now, referring to block C in FIG. 16, the Fused Feature Processing 80, a subset of the Infrared Feature Vector (A") 78 comprises the IR 1,2 Differential Motion Frequency component 144, the IR 1 Lateral Motion Frequency component 106, the IR 2 Lateral Motion Frequency component 138, the IR 1 Thermal Level component 110, the IR 2 Thermal Level component 134, the IR 1 Lateral Motion Temporal component 128, and the IR 2 Lateral Motion Temporal component 132. A subset of the Ultrasound Feature Vectors (B") 79 for this embodiment comprise the Absolute Ranges components 170, the Absolute Range—1st Return component 178, the Multipath Triangulation component 208, the Relative Range Values components 200, the Range Motion Temporal component 128, and the Range Motion Frequency component 194. The two subsets are used to extract fused features components for the Fused Feature Vector (C') 81. Infrared Spatial Frequency Components 300 are sets of distance, frequency, and levels of the objects calculated by the Spatial Correlation Processor 302, which determines the distance, frequency of movement, and size of the objects detected by the two sensors. The IR 1 Absolute Surface Temperature component 304, the IR 2 Absolute Surface Temperature component 306, and the IR Differential Absolute Surface Temperature component 308 are, respectively, temperatures and the difference in temperature found by using the Temperature Processor 310. The Infrared/Ultrasound Motion Level Correlation component 312, the Infrared/Ultrasound Motion Level Temporal Correlation component 314, and the Infrared/Ultrasound Frequency Correlation component 316 are levels of movement, the trend of the movement (slower or faster), and the frequency of movement as determined by the Correlation Processor block 318. Note, all components of the Fused Feature Vector (C') 81 are calculated by fusing features from both the infrared and ultrasound sensors.

Now referring to FIG. 17, depicting the Detection Processor 82, each of the vectors is processed by its own respective feature confidence processor and confidence criteria matrix. The feature components are processed individually and some of the feature components are fused for processing. Referring first to Infrared Feature Vector processing, the components, individual or fused, of the Infrared Feature Vector (A') 76 are processed by an Infrared Feature And Infrared Feature Fusion confidence Processor 400. In processing the components, references are made to an Infrared Confidence Criteria Matrix stored in Memory 402, which is modified by previously processed data stored in a History Buffer 404. This process produces an Infrared Feature Detection and Confidence Matrix 406, which is processed by an Infrared 1st Level Fusion Detection Processor 408 to produce an Infrared Detect Decision Confidence Vector 410. The Infrared/Ultrasound Detect Decision Confidence Vector 412 and the Ultrasound Detect Decision Confidence Vector 414 are produced in the same manner with their respective processing blocks, history buffers, and memory.

The Detection Fusion Processor 416, with reference to previously processed data stored in its History Buffer 418 and by using empirical formulas and relationships between and among the three detect decision confidence vectors (described above), produces a Feature State (D') 83. A Feature State is one of the states previously mentioned: Occupant state, Empty state, RFCS state, OOP state, and IO state.

The three vectors, Infrared Feature Vector (A') 76, Ultrasound Feature Vector (B') 88, and Fused Feature Vector (C') 81, are used to produce a Feature State (D') 83 as follows: Using the Infrared Feature Vector as an example, let Infrared Feature Vector={IRF1, IRF2, IRF3, . . . , IRF14}, where each of the IRF# represents a component, and where the Infrared Feature Vector has fourteen vector components (as shown in FIG. 18). In processing the components of the Infrared Feature Vector, the confidence processor (e.g. Infrared Feature and Infrared Feature Fusion Confidence Processor 400) refers to a confidence criteria matrix (e.g. Infrared Confidence Criteria Matrix 402), which is data empirically developed through testing under various conditions and scenarios, as described above. The confidence criteria matrix contains the confidence levels, which may be and are usually modified by previously processed data. The confidence levels indicate the likelihood of the states for the given feature component values. For each pertinent feature component or fused feature component, there is a set of confidence levels for each state.

For example, referring now to FIG. 18, for a particular Infrared Feature Vector Component ("IRFi") and states, an IRFi component value of 5 has an associated confidence level of 1.3 for the RFCS state, a confidence level of 1.3 for the OOP state, and confidence level of 0 for other states. For an IRFi value of 9, it has a confidence level of 3.3 for the IO state and 0 for other states. The confidence levels may be modified by previously processed vectors stored in the History Buffer, and may be modified to account for environmental and other changes. For example, should recent history show that the vehicle interior has changing thermal characteristics, e.g. starting the vehicle in cold weather with heater on full blast and later maintaining a consistent and warm temperature, the confidence criteria matrix is adjusted to account for this change. Since there is an overall higher thermal level in the vehicle, a higher thermal level is required to indicate the presence of occupants or their movement. Thus, over time, the confidence level for each of the states may vary. FIG. 19 shows a plot of the confidence level for one state of a particular vector component changing over time.

There are also fused features confidence levels, where two or more vector components can indicate confidence levels for the states. For example, in referring to FIG. 20, an IRF5 value of 1.2 and an IRF1 value of 1.2 would result in a high confidence value for the OOP state and 0 for other states; an IRF5 value of 3 and an IRF1 value of 1 will have a confidence level of 0 for all the states; and an IRF5 value of 2 and an IRF1 value of 3.3 will have a low confidence value for the RFCS state and 0 for other states. For each feature vector, there are a number of these possible fused vector components and their associated confidence levels. The output of the feature and fused feature processing block is a matrix, called the detection and confidence matrix (e.g. Infrared Feature Detection and Confidence Matrix), shown graphically in FIG. 21. Note that a fused vector may fuse two or more feature vector components.

The Infrared Feature Detection and Confidence Matrix 406 (FIG. 17) is input to the Infrared 1st Level Fusion Detection Processor 408. In the previous step, confidence level calculations provide each individual Infrared feature or fused features with its own detection 'decision'. These individual decisions are now factored together by state in empirically derived functional relationships and formulas, as described above, i.e.:

IR confidence (RFCS)=Function of {IRF1(RFCS), IRF2(RFCS), . . . IRFn(RFCS), IRF3,4,5(RFCS), IRF1,10,11 (RFCS), IRF8,12(RFCS), . . . };

IR confidence (Occupied)=Function of {IRF1(Occupied), IRF2 (Occupied), . . . , IRF8,12 (Occupied), . . . };

IR confidence (OOP)=Function of {IRF1(OOP), IRF2 (OOP), . . . , IRF9,11 (OOP), . . . };

IR confidence (IA)=Function of {IRF1(IA), IRF2 (IA), . . . , IRF8,12 (IA), . . . }; and IR confidence (Empty)=Function of {IRF1(Empty), IRF2 (Empty), . . . , IRF9,11 (Empty), . . . }.

Each of the above functional relationship will produce a value which indicates the confidence level (or probability value) for the associated state. The output of this process is a vector, called detect decision confidence vector (e.g. Infrared Detection Decisions Confidence Vector 410 in FIG.

17), where each state has an associated confidence value. An example of the Detect Decision Confidence Vector is: Infrared Detection Decision Confidence Vector ={OOP state: 0.02, Empty state: 0.90, RFCS state: 0.04, IO state: 0.0, Occupant state: 0.20}. In the same fashion, the Ultrasound Detect Decision Confidence Vector 414 is produced from the Ultrasound Feature Vector 88, and the Infrared/Ultrasound Detect Decision Confidence Vector is produced from the Fused Feature Vector 81.

Continuing in reference to FIG. 17, these three independent detect decision confidence vectors, Infrared 410, Infrared/Ultrasound 412, and Ultrasound 414, are inputs to a Detection Fusion Processor 416, which produces a Feature State 83. The manner in which the Feature State decision is arrived at includes weighing functions associated with each confidence vector and weighting of recent decision history stored in a History Buffer 418. For example, in the case of an RFCS, from analytical and empirical studies, we have found that the infrared feature is a "weak" indicator, the ultrasound feature is a "strong" indicator, and the combined infrared/ultrasound fused feature is a "moderately strong" indicator. With these three features, more weight will be applied to an ultrasound declared RFCS state, less weight will be applied to the fused feature declared RFCS state, and even less weight to a infrared declared RFCS state. In this fashion, the three detect decision vectors, the IR Detect Decision Confidence Vector, the US Detect Decision Confidence Vector, The IR/US Detect Decision Vector, are weighed and combined to produce a single vector with a corresponding confidence value for each of the states. The state with highest confidence value is selected as the feature state.

To summarize Feature state processing, by using the feature vector and the time-adjusted confidence criteria matrix as input, the processor performs essentially a look-up table function for the confidence levels on each vector component or fused vector component for each state. In this manner, decision making is made independently at the infrared, ultrasound, and infrared/ultrasound feature level. Furthermore, in this process, some features do not provide information on some of the states because these features alone are not dependable to make correct decisions for these states. Although some features are not reliable to make correct decisions for some of the states, in combination, these features are reliable to cover all the states, and this is the power behind the use of multiple feature fusion from the different sensors.

Note the above described preferred process involves first extracting features from raw sensory data, then producing fused features, associating confidence levels with the features and fused features to produce confidence levels for the predefined states, and determining a feature state from the confidence levels of the states. This process employs fusion at the feature level and at the detection level; it is not simple error correction routines. Other fusion methods can be employed within the principles of the present invention. An algorithm can also be used under certain circumstances to fuse the raw sensory data before any feature is extracted. An algorithm can be employed to extract features and produce a feature state from all the features extracted. Similarly, an algorithm can be utilized to extract features from each sensor, produce a state for each sensor, and fuse the states to produce a feature state. In other words, fusion of data can be done at the raw data level, feature level, decision level, or combination thereof, and any one of the above algorithm or combination thereof can be used for the present invention. The preferred embodiment utilizes a combination of fusion at the feature level and at the detection level, and the empirical comparison studies demonstrate this preferred combination provides superior accuracy in detection and discrimination for highly reliable decision.

Figure 22:
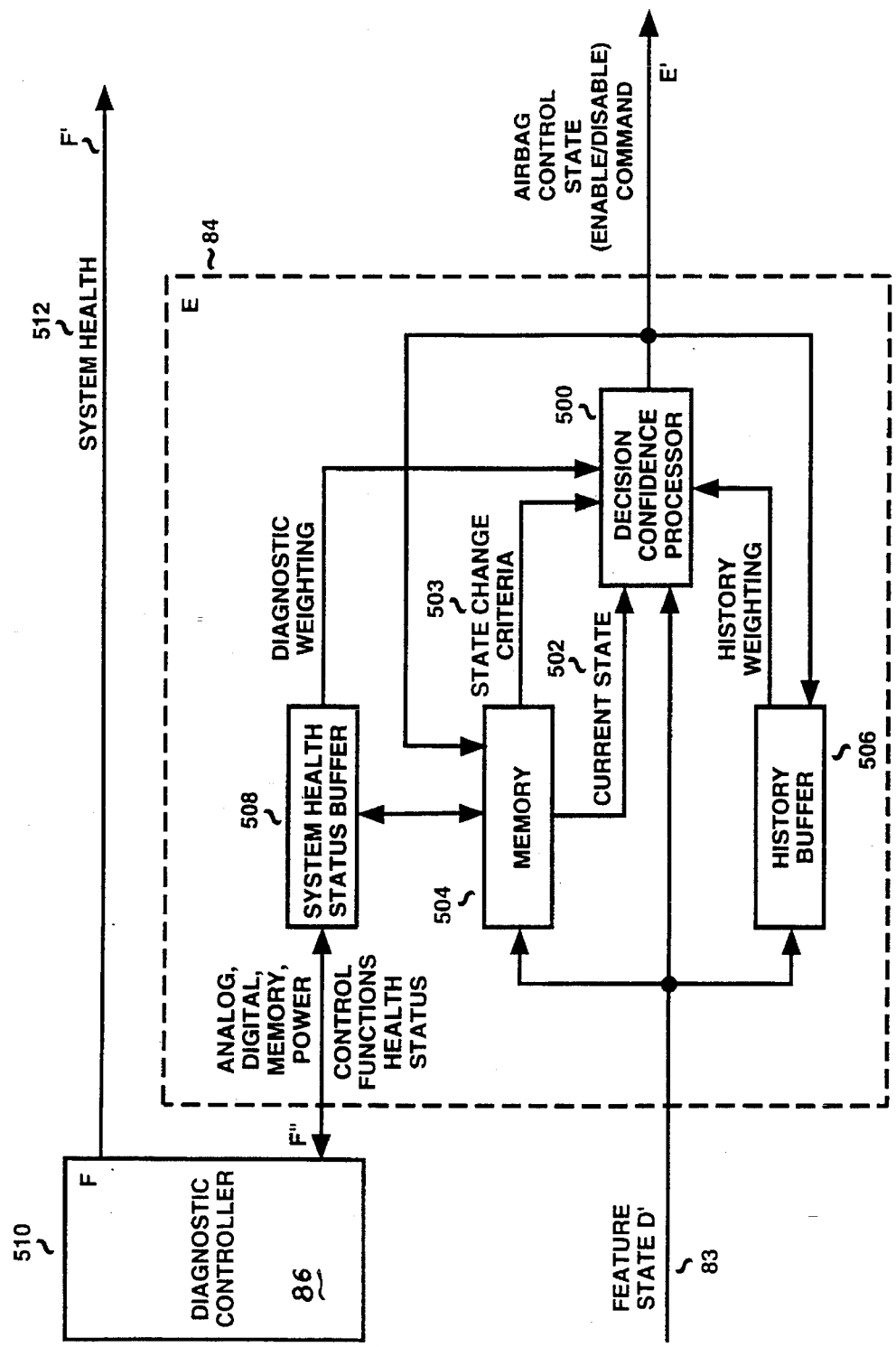
FIG. 22 is decision processing block diagram illustrating factors considered in a state change decision process.

Referring now to Decision Processing 84 (E) in FIGS. 14 and 22, the Decision Confidence Processor 500 compares the Feature State (D') against a Current State 502, State Change Criteria 503 stored in Memory 504, a History Buffer 506, and a System Health Status Buffer 508. The Current State is the state condition as determined by the sensor system, i.e. what the sensor system indicates is the state of the passenger seat, and the corresponding signal to maintain an enable or disenable signal to the air bag controller. If the presently sensed Feature State is the same as the Current State, the Current State is not changed and the History Buffer store the Feature State. If the Feature State is different from the Current State, the Decision Confidence Processor determines whether the Feature State should become the Current State. For the Current State to become the Feature State, it must satisfy the State Change Criteria stored in Memory, which is a set of predetermined criteria to ensure the highest level of safety and reliability in the decision to enable or disenable air bag deployment. The set of predetermined criteria generally requires that more confirmations be made before changing from a deployment state to a non-deployment state, and less confirmations be made in going from a non-deployment state to a deployment state. The Decision Confidence Processor also looks at the history (since start-up of the vehicle) of the Current States stored in the History Buffer and considers what Current State decisions has been made and how often has the Current State been changed. The History Buffer is updated by the Decision Confidence Processor.

In addition, a Diagnostic Controller 510 checks sensor system integrity and updates the System Health Status Buffer. The Diagnostic Controller provides a System Health 512 indicator to the air bag controller and the vehicle's indicator panel. In case of system failure, the air bag controller defaults to the air bag deployment condition, e.g., by not sending an interrupt to the air bag controller. The Decision Confidence Processor checks the System Health Status Buffer and the other system conditions to ensure the sensor system is functioning properly.

As an example of a state change decision process, if the Current State is the Empty state with the corresponding signal to disenable the air bag and the Feature State is the Occupant state, the Decision Confidence Processor will check the System Health Status Buffer to ensure proper system integrity. It will also check the History Buffer to see how many of the previous consecutive periods has the Feature State been the Occupant state or how often has the Current State been changed. The Decision Confidence Processor will change the Current State from Empty state to Occupant state if, during the last two periods, for example, the Feature State has been the Occupant state. On the other hand, if the Current State has been the Occupant state, it will take much more than two periods to change the Current State from the Occupant state to the Empty state. If the current state has been changed quite a few times previously, it will be increasingly more difficult to change the current state from occupant to empty state. This is because the preferred embodiment biases decisions regarding state change toward safety.

FIG. 23 shows, in the case of detecting a front facing occupant and permitting the air bag to deploy, while inhibiting deployment if an RFCS is detected, that the dual sensor system of the invention provides very high functional reliability. The reliability, R, of 0.98 (98%) or greater is obtained using sensor fusion even where the probability of detection $P_D$, for Sensor 1 is as low as 0.3 and the probability of false detection, $P_{FA}$, is as high as $10^{-4}$ (R of 0.27), single Sensor 2 has a $P_D$ of 0.99 and $P_{FA}$ is $10^{-6}$.

The AOS of this invention can even recognize the vehicle it is in by measuring the relative position of the module and the interior attributes of the vehicle. FIG. 24a shows actual measurements performed by the above-described AOS system in a Chrysler LH vehicle. The scope trace shows the actual time referenced acoustic returns from the test vehicle, the layout of which is shown in FIG. 24b. FIG. 25a shows actual measurements performed in a 1989 Dodge pickup truck of layout shown in FIG. 25b. Table 1 below shows the actual timing values measured by the AOS system. These results show a signal margin of 1060 μs at the IP measurement mark, 257 μs at the seat position mark and 543 μs at the floor mark. The total time difference is 1860 μs. With a time resolution of better than 20 μs, the AOS has a large signal processing margin when identifying the difference between vehicles such as a Chrysler LH and RAM truck. Comparison of the traces of FIGS. 24a and 25a show the unique signatures of the vehicle interior configurations by which the AOS of this invention can recognize the vehicle, and a normal state thereof.

TABLE 1

|  | LH | TRUCK |
|---|---|---|
| IP Return | 2804 μs | 3864 μs |
| Seat Return | 5297 μs | 5040 μs |
| Floor Return | 6933 μs | 7476 μs | we have measured several types of significant data to evaluate the potential performance of the AOS. This data shows excellent signal to noise ratios (SNR) and a large design performance margin from the sensor suite. The signal to noise values and resulting predicted performance are summarized in FIG. 26. The Pd numbers in FIG. 26 were calculated using the 4-feature fused probability equation shown below.

$$R_{1,2,3,4}=R_1+R_2+R_3+R_4-R_1(R_2+R_3+R_4)-R_2(R_3+R_4)-R_3R_4+R_1(R_2R_4+R_3R_4)+R_2(R_3R_4+R_1R_3)-R_1R_2R_3R_4$$

The individual probability inputs to the equation were derived from actual measurements and worst case analysis.

Testing conducted on typical IR detectors yielded SNR in the range of 12:1 from a normal occupant in an 83° F. vehicle. The ultrasound sensor yields a SNR of 16:1 during the same type of test. By way of comparison, the ultrasound sensor return from a rear facing child seat was measured with the RFCS both uncovered and covered with two wool blankets. The child seat was a Century brand and was placed in a 1993 Eagle Vision. The uncovered child seat gave an SNR of 20:1 while the seat covered under two blankets generated a SNR of 11:1. These signal traces are shown in FIGS. 27a and 27b, respectively. This data indicates that the system of the invention can easily discriminate even between these two subtly different occupant states.

The measurements reflected in FIGS. 22–27 were taken under static conditions in the laboratory. Assuming that under worst case conditions, the signals would be degraded by about a factor of 4, all SNR data was divided by 4. With only small gains in signal processing, the data was increased by a factor of 2. This small signal processing gain does not include using any adaptive thresholding or historical inputs in the detection process which are standard techniques that can provide substantially increased signal processing gain. Because this is a worst case analysis, such adaptive and historical gains are not included.

Using the adjusted worst case system performance numbers, detection probabilities for each sensing mode were calculated. The calculation assumptions used here were simple envelope detection using fixed thresholds in a Gaussian noise distribution, whereas the AOS of the invention uses more sophisticated detection processes and has higher individual detection probabilities to ensure adequate Pd under all conditions. The individual sensor mode detection probabilities are shown in FIG. 26, and were used to calculate the fused detection probability shown in the right hand column of FIG. 26. For this analysis a life of 15 million cycles was assumed. The probability of false alarm for this analysis was set at one in a million cycles. The false alarm probability will be reduced to an even smaller number when history and adaptive processing gains are considered. Not including these gains shows worst case system performance.

Diagnostic reliability also benefits from multi-sensor fusion much the same way that detection benefits. As shown in FIG. 26 when each sensor diagnostic probability is fused, the resultant system diagnostic probability is increased. As was done for the detection analysis, the diagnostic probability numbers began as lab measurements that were adjusted downward for worst case conditions., then adjusted for worst case signal processing gain. These individual probabilities were taken from Gaussian noise and a false alarm rate of one in a 100 million cycles.

Both IP (Instrument Panel or Dashboard) and overhead locations were evaluated and tested for operability. High reliability occupant and rear facing child seat detection can be performed from both the IP and the overhead position. Both the IR and the ultrasonic sensor performance has been determined to be location independent.

The overhead sensor position offers system performance advantages over the instrument panel (IP) mounting position. The overhead position is much harder to intentionally block by normal occupant behavior. In the overhead position, the relative geometry of the vehicle is much more easily measured. This feature allows an overhead mounted AOS to measure the relative position of the IP, the seat and the floor, and determine the type of vehicle the AOS has been placed in.

it should be understood that various modifications within the scope of this invention can be made by one of ordinary skill in the art without departing from the spirit thereof. For example, the memory and history buffers can be used to store the state decision for a predetermined period (say 60 to 600 seconds depending on size of memory supplied in the ASIC or microprocessor) prior to a crash in order to determine what the occupants did prior to or during the crash. Was a dog out of position, a passenger make unusual motions indicative of distractions or intrusions, etc? This may be dumped from time to time into a special memory in a crash "black box" along with other vital vehicle operating data, fuel level, speed, acceleration/deceleration, change of direction, braking, lights and/or wipers-on, interior climate and the like. We therefore wish our invention to be defined by the scope of the appended claims as broadly as the prior art will permit, and in view of the specification if need be.

We claim:

1. A method for determining whether or not to de-activate a vehicle's passenger passive restraint system as a function of a current state value determined by comparing measured signal features to a predetermined set of confidence values and empirical relationships obtained using various known occupancy scenarios and a set of state change criteria, comprising the steps of:

(a) sensing the characteristics of occupancy of a particular passenger seat within the vehicle using a plurality of sensors functionally associated with said passenger seat and developing a set of corresponding electrical signals;

(b) evaluating said electrical signals to determine a plurality of signal features included in each of said signals;

(c) combining certain ones of said signal features to obtain a plurality of fused features;

(d) associating said signal features and said fused features with the confidence values and empirical relationships to determine a feature state value;

(e) identifying the feature state value as the current state value if the set of state change criteria is met; and (f) generating a de-activate signal if said current state value is one of a predetermined subset of state values for which said passive restraint system is to be de-activated.

2. A method according to claim 1, wherein said passenger passive restraint system includes an air bag deployment system having an air bag that is located for deployment proximate said passenger seat and that can be de-activated in response to said de-activate signal.

3. A method according to claim 2, wherein said predetermined set of state values includes values corresponding to an empty seat state, an occupied seat state, a rear-facing child seat state, an out-of-position passenger state, and an inanimate object state.

4. A method according to claim 3, wherein:

(a) the occupied seat state corresponds to the scenarios of a person seated in said seat, a person seated in said seat holding a grocery bag, a child in a forward-facing child seat disposed in said seat, a child standing in said seat at a distance from the air bag deployment location, and a pet disposed in said seat;

(b) the rear-facing child seat state corresponds to the scenario of a child in a rear-facing child seat disposed in said seat;

(c) the out-of-position passenger state corresponds to the scenario of a person positioned in close proximity to the air bag deployment location;

(d) the inanimate object state corresponds to the scenario of an inanimate object disposed in said seat; and (e) the empty seat state corresponds to the scenario of an empty seat.

5. A method according to claim 2, wherein said occupancy scenarios include a person seated in said passenger seat, a person seated in said seat holding a grocery bag, a child in a rear-facing child seat disposed in said seat, a child in a forward-facing child seat disposed in said seat, a child in a forward-facing child seat disposed in said seat, a person positioned in close proximity to the air bag deployment location, a child standing in said seat at a distance from the air bag deployment location, a standing child in close proximity to the air bag deployment location, an empty seat, an inanimate object disposed in said seat, a pet disposed in said seat, and an empty seat.

6. A method according to claim 1, wherein said plurality of sensors is selected from the group consisting of infrared sensors, ultrasound sensors, weight sensors, microwave sensors, light sensors, and laser sensors.

7. A method according to claim 6, wherein said sensing step includes the use of two infrared detectors placed close to each other and separated by a baffle.

8. A method according to claim 7, wherein said sensing step further includes using a multi-element Fresnel lens to focus one detector on a seat back of the passenger seat and to focus the other detector on a seat surface of the passenger seat.

9. A method according to claim 1, wherein said signal features include indicia of (a) motion, (b) frequency of motion, (c) levels of motion, (d) difference in motion levels, (e) distance, (f) relative distance, (g) thermal levels, and (h) difference in thermal levels.

10. A method according to claim 9, wherein said indicia of motion include indicia of lateral notion and longitudinal motion.

11. A method according to claim 1, wherein said fused features include indicia of (a) temperature, (b) temperature differences, (c) approximate size of objects, (d) distance, (e) motion, (f) frequency of motion, and (g) levels of motion.

12. A method according to claim 1, wherein said associating step (d) comprises the substeps of:

i) using predetermined confidence values and said signal features and fused features to produce (1) a decision confidence matrix of confidence values for the signal features of the signals of each sensor, and (2) a decision confidence matrix of confidence values for said fused features;

ii) using the empirical relationships to calculate a decision confidence vector corresponding to each of said decision confidence matrices;

iii) weighing each decision confidence vector in a predetermined manner to produce weighted vectors; and iv) combining the weighted vectors to produce a resultant vector having state values from which the feature state value is selected.

13. A method according to claim 1, wherein said set of state change criteria includes consideration of previous feature state values and previous current state values.

14. A method according to claim 1, wherein the subset of said predetermined set of state values, for which said passive restraint system is to be de-activated, includes state values corresponding to a rear-facing child seat state, an empty seat state, an inanimate object state, and an out-of-position state.

15. A method according to claim 1, wherein said passive restraint system includes a single canister air bag deployment system.

16. A method according to claim 1, wherein said passive restraint system includes a multi-canister air bag deployment system capable of partially pressurizing an air bag to various degrees of pressure.

17. A method according to claim 12, further comprising modifying said confidence values over time to correspond to changes in environmental conditions of the vehicle.

18. A method according to claim 1, wherein said sensing step includes using an ultrasound sensor to transmit ultrasonic pulses and to receive ultrasonic return signals.

19. A method according to claim 18, further comprising varying the transmission times between said ultrasonic pulses.

20. A method as recited in claim 1, wherein said plurality of sensors include:

(a) a first infrared detector for generating a first raw data signal;

(b) a second infrared detector for generating a second raw data signal; and (c) an ultrasound detector for generating a third raw data signal; and wherein said evaluating step (b) includes:

i) processing said first and second raw data signals to develop a first set of signals representing a first group of signal features and defining an infrared feature vector signal;

ii) processing said third raw data signal to develop a second set of signals representing a second group of signal features and defining an ultrasound feature vector signal;

iii) selecting a subset of said first group of signal features to develop a third group of signal features defining an infrared feature vector subset signal; and iv) selecting a subset of said second group of signal features to develop a fourth group of signal features defining an ultrasound feature vector subset signal.

21. A method as recited in claim 20 wherein said combining step includes processing said infrared feature vector subset signal and said ultrasound feature vector subset signal to develop a fused feature vector signal.

22. A method as recited in claim 21, wherein the processing of said infrared feature vector subset signal and said ultrasound feature vector subset signal includes:

(a) correlating a first subset of said third group of signal features with a first subset of said fourth group of signal features to develop an infrared spatial frequency components signal;

(b) processing a second subset of said third group of signal features with a second subset of said fourth group of signal features to develop an infrared first absolute surface temperature signal, an infrared second absolute surface temperature signal, and an infrared differential absolute surface temperature signal;

(c) processing a third subset of said third group of signal features with a third subset of said fourth group of signal features to develop an infrared/ultrasound motion level correlation signal, an infrared/ultrasound motion level temporal correlation signal, and an infrared/ultrasound motion frequency correlation signal; and (d) the infrared spatial frequency components signal, the infrared first absolute surface temperature signal, the infrared second absolute surface temperature signal, the infrared differential absolute surface temperature signal, the infrared/ultrasound motion level correlation signal, the infrared/ultrasound motion level temporal correlation signal, and the infrared/ultrasound motion frequency correlation signal are to form said fused feature vector signal.

23. A method as recited in claim 22, wherein the signals representing the first group of said signal features include a first infrared lateral motion frequency signal, a first infrared thermal temporal signal, a first infrared thermal level signal, a first infrared lateral motion temporal signal, a first infrared lateral motion level signal, an infrared longitudinal motion level signal, an infrared differential motion level signal, an infrared differential motion temporal signal, an infrared differential motion frequency signal, a second infrared lateral motion frequency signal, a second infrared thermal temporal signal, a second infrared thermal level signal, a second infrared lateral motion temporal signal, and a second infrared lateral motion level signal.

24. A method as recited in claim 23, wherein the signals representing the second group of said signal features include an absolute range signal, a first return level rate of change signal, a first return level signal, an absolute range-1st return signal, a range motion signal, a range motion rate of change signal, a range motion temporal signal, a range motion frequency signal, a relative range level rate of change signal, a relative range level signal, a relative range value signal, a multipath triangulation signal, and an air temperature signal.

25. A method as recited in claim 24, wherein the signals representing the third group of said signal features include the first infrared lateral motion frequency signal, the first infrared thermal level signal, the first infrared lateral motion temporal signal, the infrared differential motion frequency signal, the second infrared lateral motion frequency signal, the second infrared thermal level signal, the second infrared lateral motion temporal signal, and the infrared differential motion frequency signal.

26. A method as recited in claim 25, wherein the signals representing the fourth group of said signal features include the absolute range signal, the absolute range-1st return signal, the range motion temporal signal, the range motion frequency signal, the relative range value signal, and the multipath triangulation signal.

27. A method as recited in claim 26, wherein the signals representing the first subset of said third group includes the first infrared lateral motion frequency signal, the second infrared lateral motion frequency signal, and the infrared differential motion frequency signal.

28. A method as recited in claim 27, wherein the signals representing second subset of said third group include the first infrared thermal level signal and the second infrared thermal level signal.

29. A method as recited in claim 28, wherein the signals representing the third subset of said third group include the first infrared lateral motion frequency signal, the second infrared lateral motion frequency signal, the first infrared lateral motion temporal signal, and the second infrared lateral motion temporal signal.

30. A method as recited in claim 29, wherein the signals representing the first subset of said fourth group include the absolute range signal, the absolute range-1st return signal, the relative range value signal, and the multipath triangulation signal.

31. A method as recited in claim 30, wherein the signals representing the second subset of said fourth group include the absolute range signal, and the absolute range-1st return signal.

32. A method as recited in claim 31, wherein the signals representing the third subset of said fourth group include the range motion temporal signal and range motion frequency signal.

33. Apparatus for determining whether or not to control a vehicle's passenger passive restraint system as a function of a current state value determined by comparing measured signal features to a predetermined set of confidence values and empirical relationships obtained using various known occupancy scenarios and a set of state change criteria, comprising:

(a) means for sensing the characteristics of occupancy of a passenger seat within the vehicle using a plurality of sensors functionally associated with said passenger seat and a set of corresponding electrical signals;

(b) means for evaluating said electrical signals to determine a plurality of signal features included in each of said signals;

(c) means for combining certain ones of said signal features to obtain a plurality of fused features;

(d) means for associating said signal features and said fused features with the confidence values and empirical relationships to determine a feature state value;

(e) means for identifying the feature state value as the current state value if the set of state change criteria is met; and (f) means for generating a state of control signal if said current state value is one of a predetermined set of state values for which said passive restraint system is to be controlled, including possible deactivation of said restraint system.

34. Apparatus according to claim 33, wherein said passenger passive restraint system includes an air bag deployment system having an air bag that is poised for deployment proximate said passenger 'seat and that can be de-activated or inflation controlled in response to said state of control signal.

35. Apparatus according to claim 34, wherein said predetermined set of state values includes values corresponding to an empty seat state, an occupied seat state, a rear-facing child seat state, an out-of-position passenger state, and an inanimate object state.

36. Apparatus according to claim 35, wherein:
(a) the occupied seat state corresponds to the scenarios of a person seated in said seat, a person seated in said seat holding a grocery bag, a child in a forward-facing child seat disposed in said seat, a child standing in said seat at a distance from the air bag deployment location, and a pet disposed in said seat;
(b) the rear-facing child seat state corresponds to the scenario of a child in a rear-facing child seat disposed in said seat;
(c) the out-of-position passenger state corresponds to the scenario of a person positioned in close proximity to the air bag deployment location;
(d) the inanimate object state corresponds to the scenario of an inanimate object disposed in said seat; and
(e) the empty seat state corresponds to the scenario of an empty seat.

37. Apparatus according to claim 34, wherein said occupancy scenarios include a person seated in said passenger seat, a person seated in said seat holding a grocery bag, a child in a rear-facing child seat disposed in said seat, a child in a forward-facing child seat disposed in said seat, a person positioned in close proximity to the air bag deployment location, a child standing in said seat at a distance from the air bag deployment location, a standing child in close proximity to the air bag deployment location, an empty seat, an inanimate object disposed in said seat, a pet disposed in said seat, and an empty seat.

38. Apparatus according to claim 33, wherein said plurality of sensors is selected from the group consisting of infrared sensors, ultrasound sensors, weight sensors, microwave sensors, light sensors, and laser sensors.

39. Apparatus according to claim 38, wherein said means for sensing includes two infrared detectors placed close to each other and separated by a baffle.

40. Apparatus according to claim 39, wherein said means for sensing further includes a multi-element Fresnel lens for focusing one detector on the seat back of the passenger seat and for focusing the other detector on the seat surface of the passenger seat.

41. Apparatus according to claim 33, wherein said signal features include indicia of (a) motion, (b) frequency of motion, (c) levels of motion, (d) difference in motion levels, (e) distance, (f) relative distance, (g) thermal levels, and (h) difference in thermal levels.

42. Apparatus according to claim 41, wherein said indicia of motion include indicia of lateral motion and longitudinal motion.

43. Apparatus according to claim 33, wherein said fused features include indicia of (a) temperature, (b) temperature differences, (c) approximate size of objects, (d) distance, (e) motion, (f) frequency of motion, and (g) levels of motion.

44. Apparatus according to claim 33, wherein said means for associating comprises:
i) means for using predetermined confidence values and said signal features and fused features to produce (1) a decision confidence matrix of confidence values for the signal features of the signals of each sensor, and 2 a decision confidence matrix of confidence values for said fused features;
ii) means for using the empirical relationships to calculate a decision confidence vector corresponding to each of said decision confidence matrices;
iii) means for weighing each decision confidence vector in a predetermined manner to produce weighted vectors; and
iv) means for combining the weighted vectors to produce a resultant vector having state values from which the feature state value is selected.

45. Apparatus according to claim 33, wherein said set of state change criteria includes consideration of previous feature state values and previous current state values.

46. Apparatus according to claim 33, wherein the subset of said predetermined set of state values, for which said passive restraint system is to be de-activated, includes state values corresponding to a rear-facing child seat state, an empty seat state, an inanimate object state, and an out-of-position state.

47. Apparatus according to claim 33, wherein said passive restraint system includes a single canister air bag deployment system.

48. Apparatus according to claim 33, wherein said passive restraint system includes a multi-canister air bag deployment system capable of partially pressurizing an air bag to various degrees of pressure.

49. Apparatus according to claim 33, further comprising means for modifying said confidence values over time to correspond to changes in environmental conditions of the vehicle.

50. Apparatus according to claim 33, wherein said means for sensing includes an ultrasound sensor for transmitting ultrasonic pulses and for receiving ultrasonic return signals.

51. Apparatus according to claim 50, further comprising means for varying the transmission times between said ultrasonic pulses.

52. Apparatus as recited in claim 33, wherein said plurality of sensors of element (a) include:
i) a first infrared detector for generating a first raw data signal;
ii) a second infrared detector for generating a second raw data signal; and
iii) at least one ultrasound detector for generating at least one third raw data signal; and wherein said means for evaluating (b) includes:
i) means for processing said first and second raw data signals and for developing a first set of signals representing a first group of signal features and defining an infrared feature vector signal;
ii) means for processing said third raw data signal and for developing a second set of signals representing a second group of signal features and defining at least one ultrasound feature vector signal;
iii) means for selecting a subset of said first group of signal features to develop a third group of signal features defining an infrared feature vector subset signal; and
iv) means for selecting a subset of said second group of signal features to develop a fourth group of signal features defining at least one ultrasound feature vector subset signal.

53. Apparatus as recited in claim 52 wherein said means for combining includes means for processing said infrared feature vector subset signal and said ultrasound feature vector subset signal to develop a fused feature vector signal.

54. Apparatus as recited in claim 53, wherein said means for processing said infrared feature vector subset signal and said ultrasound feature vector subset signal includes (a) means for correlating a first subset of said third group of signal features with a first subset of said fourth group of signal features and for developing an infrared spatial frequency components signal;

(b) means for processing a second subset of said third group of signal features with a second subset of said fourth group of signal features and for developing an infrared first absolute surface temperature signal, an infrared second absolute surface temperature signal, and an infrared differential absolute surface temperature signal;

(c) means for processing a third subset of said third group of signal features with a third subset of said fourth group of signal features and for developing at least one infrared/ultrasound motion level correlation signal, an infrared/ultrasound motion level temporal correlation signal, and an infrared/ultrasound motion frequency correlation signal; and (d) the infrared spatial frequency components signal, the infrared first absolute surface temperature signal, the infrared second absolute surface temperature signal, the infrared differential absolute surface temperature signal, the infrared/ultrasound motion level correlation signal, the infrared/ultrasound motion level temporal correlation signal, and the infrared/ultrasound motion frequency correlation signal are combined to form said fused feature vector signal.

55. Apparatus as recited in claim 54, wherein the signals representing the first group of said signal features include a first infrared lateral motion frequency signal, a first infrared thermal temporal signal, a first infrared thermal level signal, a first infrared lateral motion temporal signal, a first infrared lateral motion level signal, an infrared longitudinal motion level signal, an infrared differential motion level signal, an infrared differential motion temporal signal, an infrared differential motion frequency signal, a second infrared lateral motion frequency signal, a second infrared thermal temporal signal, a second infrared thermal level signal, a second infrared lateral motion temporal signal, and a second infrared lateral motion level signal.

56. Apparatus as recited in claim 55, wherein the signals representing the second group of said signal features include an absolute range signal, a first return level rate of change signal, a first return level signal, an absolute range-1st return signal, a range motion signal, a range motion rate of change signal, a range motion temporal signal, a range motion frequency signal, a relative range level rate of change signal, a relative range level signal, a relative range value signal, a multipath triangulation signal, and an air temperature signal.

57. Apparatus as recited in claim 56, wherein the signals representing the third group of said signal features include the first infrared lateral motion frequency signal, the first infrared thermal level signal, the first infrared lateral motion temporal signal, the infrared differential motion frequency signal, the second infrared lateral motion frequency signal, the second infrared thermal level signal, the second infrared lateral motion temporal signal, and the infrared differential motion frequency signal.

58. Apparatus as recited in claim 57, wherein the signals representing the fourth group of said signal features include at least one of: the absolute range signal, the absolute range-1st return signal, the range motion temporal signal, the range motion frequency signal, the relative range value signal, and the multipath triangulation signal.

59. Apparatus as recited in claim 58, wherein the signals representing the first subset of said third group includes the first infrared lateral motion frequency signal, the second infrared lateral motion frequency signal, and the infrared differential motion frequency signal.

60. Apparatus as recited in claim 59, wherein the signals representing second subset of said third group include the first infrared thermal level signal and the second infrared thermal level signal.

61. Apparatus as recited in claim 60, wherein the signals representing the third subset of said third group include the first infrared lateral motion frequency signal, the second infrared lateral motion frequency signal, the first infrared lateral motion temporal signal, and the second infrared lateral motion temporal signal.

62. Apparatus as recited in claim 61, wherein the signals representing the first subset of said fourth group include the absolute range signal, the absolute range-1st return signal, the relative range value signal, and the multipath triangulation signal.

63. Apparatus as recited in claim 62, wherein the signals representing the second subset of said fourth group include the absolute range signal, and the absolute range-1st return signal.

64. Apparatus as recited in claim 63, wherein the signals representing the third subset of said fourth group include the range motion temporal signal and range motion frequency signal.

65. An application specific integrated circuit device for processing sensory input signals received from sensors adapted to sense the characteristics of occupancy of a particular passenger seat within a vehicle, and for determining whether or not to de-activate a vehicle's passenger passive restraint system as a function of a current state value determined by comparing measured signal features to a predetermined set of confidence values and empirical relationships obtained using various known occupancy scenarios and a set of state change criteria, comprising in one or more chips:

(a) means for evaluating said input signals to determine a plurality of signal features;

(b) means for combining certain ones of said signal features to obtain a plurality of fused features;

(c) means for associating said signal features and said fused features with the confidence values and empirical relationships to determine a feature state value;

(d) means for identifying the feature state value as the current state value if the set of state change criteria is met; and (e) means for generating a de-activate signal if said current state value is one of a predetermined set of state values for which said passive restraint system is to be de-activated.

* * * * *